(12) United States Patent
Murata et al.

(10) Patent No.: US 8,652,619 B2
(45) Date of Patent: Feb. 18, 2014

(54) DIFFRACTIVE OPTICAL ELEMENT AND MANUFACTURING METHOD THEREOF

(75) Inventors: Akiko Murata, Osaka (JP); Yuka Okada, Hyogo (JP)

(73) Assignee: Panasonic Corporation, Osaka (JP)

( * ) Notice: Subject to any disclaimer, the term of this patent is extended or adjusted under 35 U.S.C. 154(b) by 717 days.

(21) Appl. No.: 12/744,563

(22) PCT Filed: May 13, 2009

(86) PCT No.: PCT/JP2009/002094
§ 371 (c)(1),
(2), (4) Date: May 25, 2010

(87) PCT Pub. No.: WO2010/032347
PCT Pub. Date: Mar. 25, 2010

(65) Prior Publication Data
US 2010/0246008 A1 Sep. 30, 2010

(30) Foreign Application Priority Data
Sep. 18, 2008 (JP) .................................. 2008-239360

(51) Int. Cl.
| | |
|---|---|
| G02B 5/18 | (2006.01) |
| B32B 7/02 | (2006.01) |
| G02B 1/04 | (2006.01) |
| B32B 5/16 | (2006.01) |
| B32B 27/30 | (2006.01) |

(52) U.S. Cl.
USPC ........... 428/212; 428/220; 428/323; 428/328; 428/329; 428/330; 428/331; 359/576

(58) Field of Classification Search
None
See application file for complete search history.

(56) References Cited

U.S. PATENT DOCUMENTS

| | | |
|---|---|---|
| 5,052,998 A | 10/1991 | Zimmon |
| 2009/0128912 A1 | 5/2009 | Okada et al. |

FOREIGN PATENT DOCUMENTS

| | | |
|---|---|---|
| JP | 10-268116 | 10/1998 |
| JP | 2001-249208 | 9/2001 |
| JP | 2002-138219 | 5/2002 |
| JP | 2004-361922 | 12/2004 |
| JP | 2007-291291 | 11/2007 |
| JP | 2008-056873 | 3/2008 |
| WO | 2007/026597 A1 | 3/2007 |

OTHER PUBLICATIONS

Machine translation of JP2007-291291. Retrieved Oct. 10, 2012.*
Wohlfarth, C. "Solubility Parameters of Selected Polymers". Handbook of Chemistry and Physics, (2013). pp. 13-73 to 13-74.*
International Search Report for corresponding International Application No. PCT/JP2009/002094 mailed Aug. 11, 2009.
Form PCT/ISA/237 and partial English translation for International Application No. PCT/JP2009/002094 dated Nov. 8, 2009.

* cited by examiner

*Primary Examiner* — Prashant J Khatri
(74) *Attorney, Agent, or Firm* — Renner, Otto, Boisselle & Sklar, LLP

(57) ABSTRACT

A diffractive optical element according to the present invention includes: a body 1 being composed of a first optical material containing a first resin, and having a diffraction grating 2 on a surface thereof; and an optical adjustment layer 3 being composed of a second optical material containing a second resin, and provided on the body 1 so as to cover the diffraction grating 2. The first optical material has a refractive index which is smaller than a refractive index of the second optical material; the refractive index of the first optical material has a wavelength dispersion which is greater than a wavelength dispersion of the refractive index of the second optical material; and a difference in solubility parameter between the first resin and the second resin is no less than 0.8 $[cal/cm^3]^{1/2}$ and no more than 2.5 $[cal/cm^3]^{1/2}$.

12 Claims, 7 Drawing Sheets

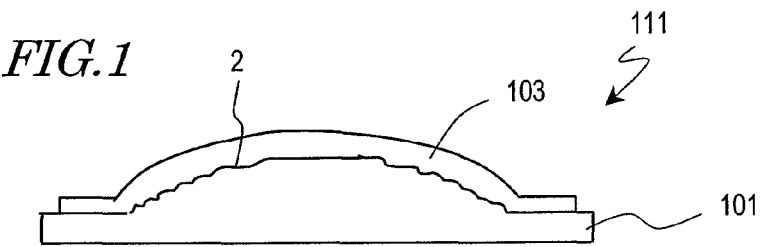
FIG.1
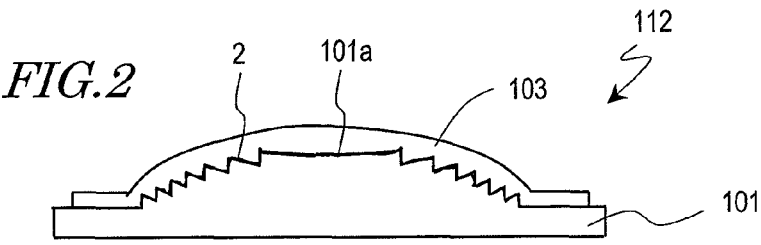
FIG.2
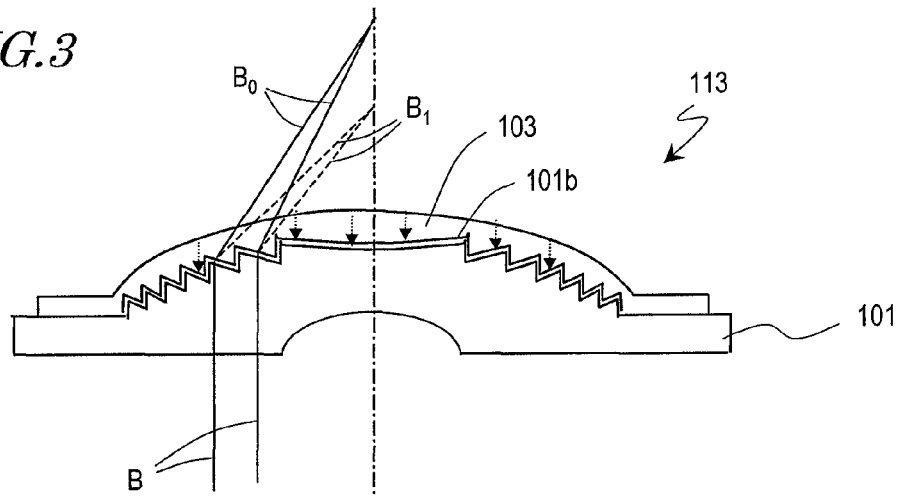
FIG.3 (a)
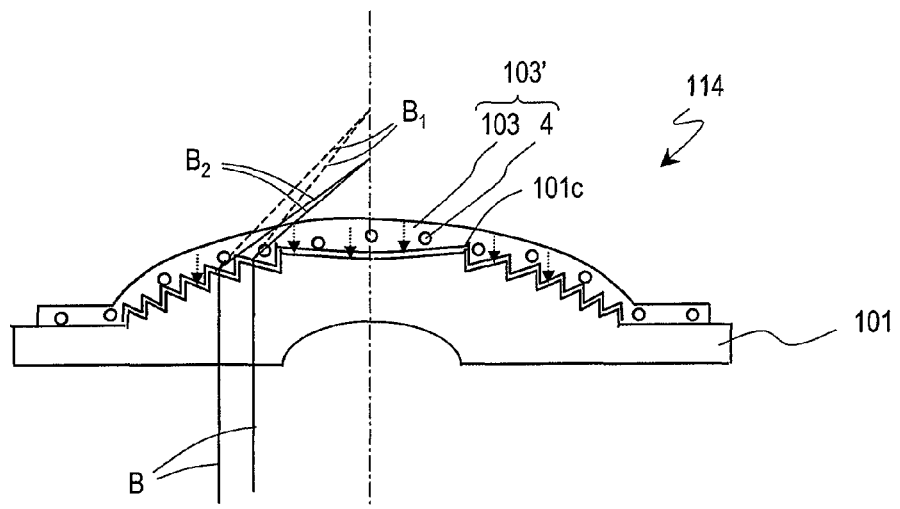
(b)

(a)

(b)

(a)

(b)

(c)

ULTRAVIOLET IRRADIATION (d)

DIFFRACTIVE OPTICAL ELEMENT AND MANUFACTURING METHOD THEREOF

TECHNICAL FIELD

The present invention relates to a diffractive optical element, and relates to a diffractive optical element which is composed of two or more members respectively containing different resins, and a production method thereof.

BACKGROUND ART

A diffractive optical element is structured so that a diffraction grating for diffracting light is provided on a body which is composed of an optical material such as a glass or a resin. Diffractive optical elements are used in the optical systems of various optical devices, including imaging devices and optical recording apparatuses. For example, lenses which are designed to gather diffracted light of a specific order to one point, spatial low-pass filters, polarizing holograms, and the like are known.

A diffractive optical element has an advantage in that it allows for a compact optical system. Moreover, conversely to refraction, a greater diffraction occurs for light of longer wavelengths. Therefore, by combining a diffractive optical element and a usual optical element which utilizes refraction, it is possible to improve the chromatic aberration and curvature of field of an optical system.

However, since diffraction efficiency theoretically depends on light wavelength, there is a problem in that, if a diffractive optical element is designed so as to attain an optimum diffraction efficiency for light of a specific wavelength, its diffraction efficiency will be lower for light of any other wavelength. For example, in the case where a diffractive optical element is employed in an optical system which utilizes white light, e.g., a lens for a camera, such wavelength dependence of diffraction efficiency will cause uneven color and flares due to light of unwanted orders, and thus it is difficult to construct an optical system having appropriate optical characteristics with diffractive optical elements alone.

Against such problems, Patent Document 1 proposes a phase-difference type diffractive optical element in which, in order to reduce the wavelength dependence of diffraction efficiency in a diffractive optical element, a diffraction grating is provided on the surface of a body that is composed of an optical material, the diffraction grating being covered by an optical adjustment layer which is composed of an optical material different from that of the body. In accordance with this structure, by selecting two optical materials so that their optical characteristics satisfy predetermined conditions, the diffraction efficiency at a designed order of diffraction can be increased, regardless of the wavelength.

Specifically, assuming that light which is transmitted through the diffractive optical element has a wavelength $\lambda$; refractive indices of the two types of optical materials at the wavelength $\lambda$ are $n1(\lambda)$ and $n2(\lambda)$; and the diffraction grating has a depth d, then the diffraction efficiency with respect to light of the wavelength $\lambda$ will be 100% when $\lambda$, d, $n1(\lambda)$ and $n2(\lambda)$ satisfy eq. (1) below.

[Eq. 1]

$$d = \frac{\lambda}{|n1(\lambda) - n2(\lambda)|} \quad (1)$$

Therefore, in order to reduce the wavelength dependence of diffraction efficiency, an optical material having a refractive index $n1(\lambda)$ and an optical material having a refractive index $n2(\lambda)$ may be combined which have wavelength dependences such that d is approximately constant in the wavelength band of the light used. Generally speaking, a material having a high refractive index and a low wavelength dispersion and a material having a low refractive index and a high wavelength dispersion are to be combined. Patent Document 1 discloses using a glass or a resin as a first optical material to become the body and using a UV-curing resin as a second optical material.

Patent Document 2 discloses, in a phase-difference type diffractive optical element having a similar structure, using glass as the first optical material and an energy beam-curing resin whose viscosity is 5000 mPa·s or less as the second optical material. It discloses that, by using such optical materials, it becomes possible to reduce the wavelength dependence of diffraction efficiency and effectively prevent uneven color, flares due to light of unwanted orders, and the like.

However, when glass is used as the first optical material to become the body, micromachining becomes more difficult than in the case of a resin, and therefore it is not easy to obtain a narrow diffraction grating pitch for improving the diffraction performance. Thus, it is difficult to enhance the optical performance while downsizing the optical element. Moreover, since the molding temperature of glass is higher than that of resin, a mold for molding glass has a lower durability than that of a mold for molding resin, thus resulting in a producibility problem.

On the other hand, when a resin is used as the first optical material to become the body, the diffraction grating has a better processibility and moldability than those of glass. However, it is more difficult to realize various refractive index values than in the case of glass, so that the reduced refractive index difference between the first optical material and the second optical material is reduced, and thus the diffraction grating will have a large depth d, as is clear from eq. (1).

As a result of this, although the body itself has an excellent processibility, the mold must be processed deep for forming the diffraction grating and the edges of the grooves must be shaped sharp, which makes the mold processing difficult. Moreover, due to processing constraints of at least one of the body and the mold, the pitch of the diffraction grating need to be made larger as the diffraction grating becomes deeper. Therefore, the number of the diffraction grating cannot be increased, and the design constraints of the diffractive optical element are increased.

In order to solve such problems, the Applicants of the present application have proposed in Patent Document 3 to use a composite material as an optical adjustment layer, such that inorganic particles with an average particle size of 1 nm to 100 nm are contained in a matrix resin. With this composite material, it is possible to control the refractive index and Abbe number depending on the material of the inorganic particles to be dispersed and the added amount of the inorganic particles, thus providing refractive indices and Abbe numbers beyond what can be obtained with conventional resins. Therefore, by employing a composite material for the optical adjustment layer, an increased design freedom for the diffraction grating is obtained when using a resin as the first optical material to become the body, and an improved moldability is obtained, while providing wavelength characteristics with an excellent diffraction efficiency.

CITATION LIST

Patent Literature

[Patent Document 1] Japanese Laid-Open Patent Publication No. 10-268116
[Patent Document 2] Japanese Laid-Open Patent Publication No. 2001-249208
[Patent Document 3] A pamphlet of International Publication No. 07/026597

SUMMARY OF INVENTION

Technical Problem

The inventors have found that, in the phase-difference type diffractive optical elements disclosed in Patent Documents 1 to 3, when the body and the optical adjustment layer are composed of a resin material, depending on the type of the resin material, the body may swell or dissolve at a portion where the body adjoins the optical adjustment layer, thus causing a problem in that the shape of the diffraction grating may deviate from its design values. When the shape of the diffraction grating deviates from its design values, diffracted light of an order which is different from the designed order (hereinafter referred to as "unwanted diffracted light") or stray light may occur, thus deteriorating the diffraction efficiency. Moreover, the inventors have found that unwanted diffracted light may occur even when the diffraction grating shape does not significantly swell.

The present invention solves such problems of the conventional techniques, and aims to provide a diffractive optical element having good optical characteristics, as well as a production method thereof.

Solution to Problem

A diffractive optical element according to the present invention comprises: a body being composed of a first optical material containing a first resin, and having a diffraction grating on a surface thereof; and an optical adjustment layer being composed of a second optical material containing a second resin, and provided on the body so as to cover the diffraction grating, wherein, the first optical material has a refractive index which is smaller than a refractive index of the second optical material; the refractive index of the first optical material has a wavelength dispersion which is greater than a wavelength dispersion of the refractive index of the second optical material; and a difference in solubility parameter between the first resin and the second resin is no less than 0.8 $[cal/cm^3]^{1/2}$ and no more than 2.5 $[cal/cm^3]^{1/2}$.

In a preferred embodiment, the difference in solubility parameter between the first resin and the second resin is no less than 0.8 $[cal/cm^3]^{1/2}$ and no more than 2.3 $[cal/cm^3]^{1/2}$.

In a preferred embodiment, the second optical material further contains inorganic particles, the inorganic particles being dispersed in the second resin.

In a preferred embodiment, as a main component, the inorganic particles contain at least one selected from the group consisting of zirconium oxide, yttrium oxide, lanthanum oxide, hafnium oxide, scandium oxide, alumina, and silica.

In a preferred embodiment, the inorganic particles have an effective particle size of no less than 1 nm and no more than 100 nm.

In a preferred embodiment, the solubility parameter of the second resin is greater than the solubility parameter of the first resin by 0.8 $[cal/cm^3]^{1/2}$ or more.

In a preferred embodiment, the second resin has an OH group.

In a preferred embodiment, the first resin is polycarbonate.

In a preferred embodiment, the second resin is an energy beam-curing resin.

A production method of a diffractive optical element according to the present invention comprises: a step of providing a body being composed of a first optical material containing a first resin, and having a diffraction grating on a surface thereof; a step of placing on the body a raw material of a second optical material containing a raw material of a second resin, so as to cover the diffraction grating; and a step of curing the raw material of the second resin to form an optical adjustment layer composed of the second optical material, wherein, the first optical material has a refractive index which is smaller than a refractive index of the second optical material; the refractive index of the first optical material has a wavelength dispersion which is greater than a wavelength dispersion of the refractive index of the second optical material; and a difference in solubility parameter between the first resin and the raw material of the second resin is no less than 0.8 $[cal/cm^3]^{1/2}$ and no more than 2.5 $[cal/cm^3]^{1/2}$.

In a preferred embodiment, the difference in solubility parameter between the first resin and the second resin is no less than 0.8 $[cal/cm^3]^{1/2}$ and no more than 2.3 $[cal/cm^3]^{1/2}$.

In a preferred embodiment, in the step of forming the optical adjustment layer, the raw material of the second resin is cured while a mold defining an outer shape of the optical adjustment layer is pressed against the raw material of the second optical material.

In a preferred embodiment, the raw material of the second optical material further contains a solvent and inorganic particles; the difference in solubility parameter between the first resin and the solvent is no less than 0.8 $[cal/cm^3]^{1/2}$ and no more than 2.5 $[cal/cm^3]^{1/2}$; a step of removing the solvent from the raw material of the second optical material is further comprised, after the step of placing the raw material of the second optical material and before the step of forming the optical adjustment layer; and the step of forming the optical adjustment layer cures the raw material of the second resin to generate the second resin such that the inorganic particles are dispersed in the second resin.

In a preferred embodiment, the difference in solubility parameter between the first resin and the solvent is no less than 0.8 $[cal/cm^3]^{1/2}$ and no more than 2.3 $[cal/cm^3]^{1/2}$.

In a preferred embodiment, in the step of forming the optical adjustment layer, the raw material of the second resin is cured while a mold defining an outer shape of the optical adjustment layer is pressed against the raw material of the second optical material.

Advantageous Effects of Invention

According to the present invention, a body having a diffraction grating provided thereon and an optical adjustment layer are each composed of a resin-containing optical material, such that the difference between the solubility parameters of the two resins is no less than 0.8 $[cal/cm^3]^{1/2}$ and no more than 2.5 $[cal/cm^3]^{1/2}$. As a result, interaction between the resin of the body and the resin of the optical adjustment layer can be suppressed, thus providing a diffractive optical element having good optical characteristics in which deformation of the diffraction grating is suppressed and occurrence of unwanted diffracted light and stray light due to changes in the refractive index of the body is suppressed.

BRIEF DESCRIPTION OF DRAWINGS

[FIG. 1] A diagram schematically showing a conventional diffractive optical element having a deformed diffraction grating.

[FIG. 2] A diagram schematically showing, in a conventional diffractive optical element, a layer with an altered refractive index having been formed at the interface between a body and an optical adjustment layer.

[FIG. 3] (a) and (b) are diagrams showing, in a conventional diffractive optical element in which a layer with an altered refractive index is formed at the interface between a body and an optical adjustment layer, a relationship between the material of the optical adjustment layer and unwanted diffracted light.

DESCRIPTION OF EMBODIMENTS

Figure 4:
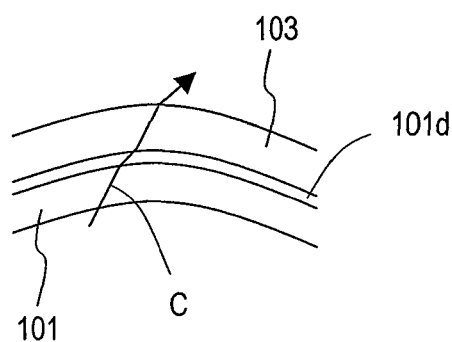
[FIG. 4] A diagram schematically showing refraction of light in an optical element in which a layer with an altered refractive index is formed at the interface between a body and an optical adjustment layer.

The inventors have stumoldd in detail a swell of the body, in a conventional diffractive optical element, that occurs due to use of resin-containing materials for both the body and the optical adjustment layer. Hereinafter, the results of the study will be described.

A conventional diffractive optical element 111 shown in FIG. 1 includes: a body 101 having a diffraction grating 2 provided on its surface; and an optical adjustment layer 103 which is provided so as to cover the diffraction grating 2. If the optical adjustment layer 103 and the body 101 are made of resin-containing optical materials, such that there is a strong interaction between the two optical materials, the body 101 may swell or dissolve at the portion where the body 101 adjoins the optical adjustment layer 103, whereby the shape of the diffraction grating 2 may be deformed as shown in FIG. 1. When the shape of the diffraction grating 2 is deformed, diffracted light of a desired order may not be obtained with a sufficient intensity, or unwanted diffracted light may occur.

The inventors have found that unwanted diffracted light may occur in the diffractive optical element 111 even if there is no change in the shape of the diffraction grating 2. As shown in FIG. 2, it has been confirmed in the conventional diffractive optical element 112 that, even when the shape of the diffraction grating 2 provided on the surface of the body 101 is not greatly changed, if the resin contained in the optical adjustment layer 103 permeates through the surface of the body 101, the refractive index of the body 101 is changed at the portion where the resin has permeated, so that a layer 101a having a different refractive index (hereinafter referred to as the "altered-refractive index layer") is formed at the interface between the body 101 and the optical adjustment layer 103, as shown in FIG. 2. The altered-refractive index layer 101a can be confirmed with an optical microscope, and the altered-refractive index layer 101a had a thickness of about 500 nm to 5000 nm.

Thus, it can be seen that, when a change in the shape of the diffraction grating 2 or generation of the altered-refractive index layer 101a is confirmable through visual inspection or optical microscope observation, the diffractive optical element 112 will not exhibit optical characteristics as designed.

The inventors have also discovered a phenomenon where, even if no altered-refractive index layer is observable with an optical microscope, unwanted diffracted light may occur in a diffractive optical element, thus deteriorating its $1^{st}$ order diffraction efficiency. In order to study this phenomenon in detail, a diffractive optical element was analyzed whose $1^{st}$ order diffraction efficiency had deteriorated even though no altered-refractive index layer was observable with an optical microscope. In the analysis, a prism coupler capable of highly accurate refractive index measurements (MODEL2010 manufactured by Metricon Corporation) was used to measure the refractive index of the body at a portion where it adjoined the optical adjustment layer.

As a result, it was found that, in a system where the optical adjustment layer was composed of a resin, the refractive index of the body was increased by about 0.01 in the portion adjoining the optical adjustment layer than in the non-adjoining portions. On the other hand, it was found that, in a system where the optical adjustment layer was composed of a composite material, the refractive index of the body was decreased by about 0.01 in the portion adjoining the optical adjustment layer than in the non-adjoining portions. That is, it was found that the material of the optical adjustment layer had permeated into the body at a level not observable with an optical microscope, thus causing a minute change in the refractive index. Since the thickness of such a layer with an altered refractive index cannot be observed with an optical microscope, the exact thickness thereof is not known, but it is estimated to be about 50 nm to 500 nm.

Based on these results, a mechanism by which unwanted diffracted light occurs in an optical element due to a change in the refractive index of the body 101 will be specifically described with reference to FIG. 3.

First, as shown in FIG. 3(a), a diffractive optical element 113 will be discussed which utilizes $1^{st}$ order diffracted light by employing different resins for the body 101 (refractive index N1) and the optical adjustment layer 103 (refractive index N2). It is presumable from a study of the inventors that, as a result of the resin composing the optical adjustment layer 103 having permeated into the body 101, an altered-refractive index microlayer 101b whose refractive index is slightly changed due to resin permeation is generated, although not observable with an optical microscope. When the refractive indices of the body 101 and the optical adjustment layer 103 satisfy the relationship N1<N2, a refractive index N3 of the generated altered-refractive index microlayer 101b satisfies the relationship N1<N3<N2.

When the refractive indices N1 and N2 are designed so as to satisfy eq. (1) in the wavelength band that is used, the differences in optical distance between stepped portions composing the diffraction grating, i.e., phase differences, become smaller than the design value due to the altered-refractive index microlayer 101b formed at the interface, so that eq. (1) is no longer satisfied. As a result, a diffraction efficiency of the diffractive optical element 113 when light B in the wavelength band used is incident, i.e., the emission efficiency of $1^{st}$ order diffracted light $B_1$, becomes lower than the design value. At this time, mainly $0^{th}$ order diffracted light $B_0$ occurs as unwanted diffracted light. The $0^{th}$ order diffracted light $B_0$ has a longer focal length than that of $1^{st}$ order diffracted light $B_1$.

On the other hand, in the case where the composite material disclosed in Patent Document 3 is used as the optical adjustment layer, the aforementioned problem also occurs due to permeation of the matrix resin contained in the composite material into the body. A diffractive optical element 114 will be discussed which utilizes $1^{st}$ order diffracted light by using the body 101 and an optical adjustment layer 103' that is constructed by dispersing inorganic particles 4 in a matrix resin 103 as shown in FIG. 3(b). It is assumed that the refractive indices of the body 101 and the optical adjustment layer 103' are N1 and N2, and the matrix resin 103 has a refractive index N4. In this case, it is presumable that, as described above, only the matrix resin 103 in the optical adjustment layer 103' permeates into the body 101, and thus an altered-refractive index microlayer 101c whose refractive index is slightly changed due to resin permeation is generated, although not confirmable with an optical microscope.

When the refractive indices of the body 101, the optical adjustment layer 103', and the matrix resin 103 satisfy the relationships N1<N2 and N4<N1, the refractive index N3 of the generated altered-refractive index microlayer 101c satisfies the relationship N1>N3<N2. The reason is that inorganic particles 4 on the nanometer order cannot move into the body 101, and that the matrix resin 103 having a smaller refractive index than does the body 101 permeates to generate the altered-refractive index microlayer 101c.

Similarly to the above-described case, when the refractive indices N1 and N2 are designed so as to satisfy eq. (1) in the wavelength band used, due to the altered-refractive index microlayer 101c formed at the interface, the differences in optical distance between stepped portions composing the diffraction grating, i.e., phase differences, become larger than the design value, so that eq. (1) is no longer satisfied. As a result, the diffraction efficiency of the diffractive optical element 113 when light B in the wavelength band used is incident, i.e., the emission efficiency of $1^{st}$ order diffracted light $B_1$, becomes lower than the design value. At this time, mainly $2^{nd}$ order diffracted light $B_2$ occurs as unwanted diffracted light. The $2^{nd}$ order diffracted light $B_2$ has a shorter focal length than that of $1^{st}$ order diffracted light $B_1$.

In an optical system which only utilizes the usual refraction phenomenon, as shown in FIG. 4, even if the altered-refractive index microlayer 101c is generated between the body 101 and the optical adjustment layer 103, the angle at which light C entering from the body 101 is refracted at the interface between the body 101 and the altered-refractive index microlayer 101c will be small so long as the difference in refractive index between the altered-refractive index microlayer 101 and the body 101 is about 0.01. Moreover, if the altered-refractive index microlayer 101c is thin, the distance traveled by the light C at the refracted angle will also be short. Therefore, even if the altered-refractive index microlayer 101c is generated, the incident angle and incident position of the light C entering the optical adjustment layer 103 are hardly changed from those in the case where the altered-refractive index microlayer 101c is not generated, and the influence on the optical performance is negligibly small. In other words, even if the altered-refractive index microlayer 101c is generated to a degree not observable with an optical microscope, its influence is negligible.

However, in the case of a diffractive optical element, as described above, even an altered-refractive index microlayer that is generated to a degree not observable with an optical microscope will prevent the diffraction condition (1) from being satisfied. Therefore, generation of any altered-refractive index microlayer will immediately result in the generation of unwanted diffracted light. As a result, the diffraction efficiency at the designed order will be greatly reduced.

In particular, in the case where a material containing a UV-curing resin or a thermosetting resin is used as the optical adjustment layer from the standpoint of producibility, uncured resin, i.e., monomer and oligomer, will be in contact with the body in a step of forming the optical adjustment layer. Since the monomer and oligomer have smaller molecular weights than those of the cured resin, they have a higher reactivity and permeability with respect to the body 101 than does the cured resin. In other words, the aforementioned deformation of the diffraction grating and deteriorations in diffraction efficiency due to generation of an altered-refractive index layer or altered-refractive index microlayer are likely to occur.

Moreover, in the case where a composite material is used for the optical adjustment layer, a solvent may sometimes be added to the raw material composing the optical adjustment layer, in order to allow inorganic particles to be uniformly dispersed in the matrix resin or to adjust the viscosity of the optical adjustment layer in the step of forming the optical adjustment layer. Similarly to the resin material in the optical adjustment layer, such a solvent may induce a change in the refractive index upon dissolution into the body or permeation into the body, thus causing the aforementioned problems.

In order to solve such problems, the inventors have paid attention to solubility parameters of the resins composing the body and the optical adjustment layer, and found that, so long as the difference in solubility parameter therebetween is equal to or greater than a predetermined value, the aforementioned deformation of the diffraction grating and deteriorations in diffraction efficiency due to generation of an altered-refractive index layer or altered-refractive index microlayer can be surely prevented. This has been found to surely prevent formation of an altered-refractive index microlayer that cannot even be confirmed with an optical microscope, in particular, thus realizing a diffractive optical element with an optical performance as designed. Hereinafter, embodiments of the diffractive optical element according to the present invention will be specifically described.

(First Embodiment)

FIGS. 5(a) and (b) are a cross-sectional view and an upper plan view showing a first embodiment of the diffractive optical element according to the present invention. A diffractive optical element 21 shown in FIGS. 5(a) and (b) includes a body 1 and an optical adjustment layer 3.

The body 1 is composed of a first optical material containing a first resin, and has a diffraction grating 2 on its surface. In the present embodiment, the first optical material only contains the first resin. The cross-sectional shape, positioning, pitch, and depth of the diffraction grating 2 are to be determined based on the optical characteristics of the body 1 and the optical adjustment layer 3 and the optical characteristics which are required of the diffractive optical element 21. For example, in order to confer a lens action to the diffractive optical element 21, an annular diffraction grating having a sawtooth cross-sectional shape is provided in the form of concentric circles with pitches gradually changing from the lens center toward the perimeter. The diffraction grating in this case simply needs to have a cross-sectional shape, positioning, and pitch for attaining a lens action, and the diffraction grating 2 may be formed on a curved surface as shown in FIG. 5(a), or on a plane. In particular, by forming the diffraction grating 2 so that an envelope which extends through the grooves of the diffraction grating presents an aspherical surface having a lens action, the chromatic aberration, curvature of field, and the like can be improved with a good balance on the basis of an optimum combination of refractive action and diffractive action, whereby a lens with a high imaging performance can be obtained. Note that the depth of the diffraction grating 2 can be determined by using eq. (1).

Although the body 1 of the diffractive optical element 21 shown in FIGS. 5(a) and (b) has the diffraction grating 2 on one face, diffraction gratings 2 may be provided on both faces of the body 1. Moreover, as shown in FIG. 5(a), the body 1 has a convex surface and a plane, with the diffraction grating 2 being provided on the convex surface. The shapes of the two opposite principal faces of the body 1 are not limited to this combination, but may be a combination of other shapes. Specifically, the two opposite principal faces of the body 1 may be both convex surfaces, a convex surface and a concave surface, both concave surfaces, a concave surface and a plane, or both planes. In this case, the diffraction grating(s) 2 may be formed on only one face, or on both faces. In the case where the diffraction gratings are formed on both faces, the diffraction gratings on both faces do not need to be identical in shape, positioning, pitch, and diffraction grating depth, so long as they satisfy the performance that is required of the diffractive optical element.

The optical adjustment layer 3 is composed of a second optical material containing a second resin, and is provided on the surface of the body 1 so as to cover the diffraction grating 2. In the present embodiment, the second optical material only contains the second resin. The optical adjustment layer 3 is provided for the purpose of reducing the wavelength dependence of diffraction efficiency due to the body 1.

In the case where the optical adjustment layer 3 is provided on the body 1 whose diffraction grating 2 is formed so that an envelope which extends through the grooves of the diffraction grating 2 presents an aspherical surface having a lens action, the surface of the optical adjustment layer 3 may be matched to a corresponding aspherical shape, whereby the refractive action and the diffractive action are blended so that the chromatic aberration and the curvature of field are reduced to attain improved lens characteristics.

In order to reduce the wavelength dependence of diffraction efficiency due to the body 1, assuming that the first optical material composing the body 1 has a refractive index $n1(\lambda)$ at a wavelength $\lambda$, and that the second optical material composing the optical adjustment layer 3 has a refractive index $n2(\lambda)$ at the wavelength $\lambda$, the first optical material and second optical material need to be selected so as to approximately satisfy eq. (1) with respect to the wavelength $\lambda$ in a desired range. For example, a material having a wavelength dependence of the refractive index showing an opposite tendency to that of the wavelength dependence of the refractive index of the first optical material may be selected as the second optical material. More specifically, in the wavelength range of light in which the diffractive optical element 21 is to be used, the refractive index of the first optical material is smaller than the refractive index of the second optical material, and the wavelength dispersion of the refractive index of the first optical material is greater than the wavelength dispersion of the refractive index of the second optical material. In other words, the second optical material needs to be a material having a lower refractive index and a higher dispersion than those of the first optical material.

The wavelength dispersion of the refractive index is expressed by an Abbe number, for example. The greater the Abbe number is, the smaller the wavelength dispersion of the refractive index is. Therefore, the refractive index of the first optical material needs to be smaller than the refractive index of the second optical material, and the Abbe number of the first optical material needs to be smaller than the Abbe number of the second optical material.

In addition to such optical characteristics, it is necessary that the difference in solubility parameter (SP value) between the first resin contained in the first optical material and the second resin contained in the second optical material is equal to or greater than 0.8 $[cal/cm^3]^{1/2}$. As a result, interaction between the body 1 and the optical adjustment layer 3 can be prevented in the diffractive optical element 21, whereby a diffractive optical element can be obtained which is free of unwanted diffracted light and stray light due to changes in the refractive index of the body 1 and which has good optical characteristics and a high mass producibility.

The solubility parameter is a square root of the cohesive energy density of a substance under the regular solution theory, and is defined by the following equation, using a molar volume V and a cohesive energy $\Delta E$ per mol.

$$\delta = (\Delta E/V)^{1/2}$$

The solubility parameter is an index of the intermolecular force of a substance, and it is considered that substances having closer solubility parameters have a higher affinity. There are various methods to derive a solubility parameter. For example, a value which is obtained by a method, of Fedors et al., of calculating from a molecular structural formula can be used. The solubility parameter to be used in the present specification is a value which is determined by this method of calculating from the molecular structural formula. Examples of structures that enhance the solubility parameter include highly polar functional groups, such as the OH group (hydroxy group) and the amide bond. On the other hand, examples of structures that lower the solubility parameter include the fluorine atom, the hydrocarbon group, the siloxane bond, and the like.

The inventors have confirmed that, when the difference between the solubility parameter of the first resin composing the body 1 and the solubility parameter of the second resin contained in the second optical material composing the optical adjustment layer 3 is smaller than 0.8 $[cal/cm^3]^{1/2}$, one of phenomenons (1) to (3) below will occur, thus deteriorating the diffraction efficiency of the diffractive optical element at the designed order.

(1) The second resin contained in the optical adjustment layer 3 intrudes into the first resin of the body 1, thus causing a deformation of the diffraction grating 2 due to swelling or dissolution of the body 1.

(2) Although deformation of the diffraction grating 2 is not observed, generation of an altered-refractive index layer is observed.

(3) Although deformation of the diffraction grating 2 or an altered-refractive index layer cannot be optically observed, occurrence of unwanted diffracted light is confirmed in an optical characteristics evaluation, due to generation of an altered-refractive index microlayer.

It has also been confirmed that, when the difference between the solubility parameter of the first resin composing the body 1 and the solubility parameter of the second resin contained in the second optical material composing the optical adjustment layer 3 is equal to or greater than 0.8 $[\text{cal/cm}^3]^{1/2}$, these phenomenons are not observed and the diffraction efficiency of the diffractive optical element at the designed order is not deteriorated.

If the difference between the solubility parameter of the first resin composing the body 1 and the solubility parameter of the second resin contained in the second optical material composing the optical adjustment layer 3 is equal to or greater than 0.8 $[\text{cal/cm}^3]^{1/2}$, as the difference becomes greater, the body 1 becomes less likely to be affected by the optical adjustment layer 3, and deformation of the diffraction grating 2 and generation of an altered-refractive index layer or altered-refractive index microlayer become less likely to occur. However, if the difference between the solubility parameter of the first resin and the solubility parameter of the second resin becomes extremely large, the affinity between the body 1 and the optical adjustment layer 3 may become poor, thus deteriorating the closeness of contact. As a result, the production yield may be lowered, and the optical adjustment layer 3 may peel during use.

From the above, in order to prevent peeling of the optical adjustment layer 3, it is preferable that the difference between the solubility parameter of the first resin composing the body 1 and the solubility parameter of the second resin contained in the second optical material composing the optical adjustment layer 3 is in the range of no less than 0.8 $[\text{cal/cm}^3]^{1/2}$ and no more than 2.5 $[\text{cal/cm}^3]^{1/2}$. Furthermore, in order to ensure yield from the standpoint of producibility, it is particularly preferable that the difference between the solubility parameter of the first resin and the solubility parameter of the second resin is in the range of no less than 0.8 $[\text{cal/cm}^3]^{1/2}$ and no more than 2.3 $[\text{cal/cm}^3]^{1/2}$.

As the first resin, among the translucent resin materials which are commonly used for the body of an optical element, a resin is selected which has refractive index characteristics and wavelength dispersion that enable reduction of the wavelength dependence of diffraction efficiency at the designed order of the diffractive optical element 21. By using a resin as the material of the body 1, the molding process is facilitated and a high producibility is obtained, and it becomes possible to reduce the size and weight of the diffractive optical element 21 to be finally obtained. For example, due to excellence in translucency, it is preferable to select a polycarbonate-type resin, an acrylic resin such as polymethyl methacrylate (PMMA) or alicyclic acrylic resin, an alicyclic olefin resin, or the like as the first resin. For the purpose of improving the moldability, mechanical characteristics, and the like, these resins may be allowed to copolymerize with another resin, alloyed with another resin, or another resin may be blended thereto. Thus, the first resin may only contain a single resin, or two or more resins. In this case, the solubility parameter of the first resin is to be calculated based on a mixing ratio between the two or more resins.

Other than the first resin, the first optical material may contain inorganic particles for adjusting optical characteristics, e.g., the refractive index, and dynamic properties, e.g., thermal expansion, and additives such as a dyestuff or pigment for absorbing electromagnetic waves in a specific wavelength region. These inorganic particles and additives are not main constituent elements constituting the first optical material. Moreover, since these inorganic particles in the body 1 are not organic compounds, the second resin will not permeate therein. The additives may contain organic compounds, but the added amounts of the additives are on the order of several weight %, and thus there will be hardly any influence on the optical characteristics of the entire first optical material even if the second resin permeates the organic compounds in the additives. Thus, in the calculation of the solubility parameters, there is no need to consider any inorganic particles and additives to be added other than the first resin, because they will not affect the occurrence of the aforementioned phenomenons (1) to (3).

There is no limitation as to the second resin contained in the second optical material composing the optical adjustment layer 3, so long as its solubility parameter differs from that of the body 1 by 0.8 $[\text{cal/cm}^3]^{1/2}$ or more. For example, (meth) acrylic resins such as polymethyl methacrylate, acrylate, methacrylate, urethane acrylate, epoxy acrylate, and polyester acrylate; epoxy resins; oxetane resins; thiol-ene resins; polyester resins such as polyethylene terephthalate, polybutylene terephthalate, and polycaprolactone; polystyrene resins such as polystyrene; olefin resins such as polypropylene; polyamide resins such as nylon; polyimide resins such as polyimide and polyetherimide; polyvinyl alcohol; butyral resins; vinyl acetate resins; alicyclic polyolefin resins; and the like can be used. Moreover, a mixture or copolymer of these resins (polymers) may be used, and what is obtained by denaturing these resins may be used. Similarly to the first resin, in the case where the second resin contains two or more resins, the solubility parameter of the second resin is to be calculated based on a mixing ratio between the two or more resins.

Among others, it is particularly preferable to use energy beam-curing type resins, specifically, thermosetting resins or energy beam-curing resins such as light- or ultraviolet- as the second resin, because it will facilitate the process of forming the optical adjustment layer 3. More specifically, it is preferable to use an acrylate resin, a methacrylate resin, an epoxy resin, an oxetane resin, an thiol-ene resin, or the like as the second resin.

By supplying a heat or an energy beam to a monomer or oligomer serving as the raw material, a thermosetting resin or an energy beam-curing resin is obtained as a resin having a cross-linking structure in which the monomer or oligomer has polymerized. In the case where any such resin is used as the second resin, in the step of forming the optical adjustment layer 3, a precess occurs in which the monomer or oligomer having a relatively low molecular weight comes in direct contact with the body 1. Although a low-molecular weight component has a higher permeability with respect to a resin than does a high-molecular weight component, a detailed experiment by the inventors has revealed that permeation of the first resin into the monomer or oligomer to become the second resin can be prevented so long as the difference between the solubility parameter of the second resin before polymerization, i.e., the monomer or oligomer and the solubility parameter of the first resin is equal to or greater than 0.8 $[\text{cal/cm}^3]^{1/2}$. Note that the solubility parameter of the monomer or oligomer to become the second resin and the solubility parameter of the second resin after polymerization or curing are approximately equal.

Due to its molecular structure including a reactive functional group having polarity, it is difficult for a thermosetting resin or an energy beam-curing resin to have a solubility parameter which is smaller than the solubility parameter of the first resin by 0.8 $[\text{cal/cm}^3]^{1/2}$ or more. Therefore, in the case where a thermosetting resin or an energy beam-curing resin is to be used as the second resin, it is particularly preferable to use a second resin having a solubility parameter which is greater than the solubility parameter of the first resin by 0.8 $[\text{cal/cm}^3]^{1/2}$ or more.

As mentioned earlier, examples of structures that enhance the solubility parameter are the OH group, the amide bond, and the like. Among others, a resin having an OH group is easy to synthesize, and is highly stable because it is less susceptible to hydrolysis or the like than a resin having a polar bond such as an amide bond. Therefore, it is more preferable to use as the second resin a resin in which an OH group exists. On the other hand, in order to lower the solubility parameter, a resin of an alicyclic structure having a small polarity, or a resin having a fluorine atom or a siloxane structure may be used.

Note that the diffractive optical element 21 may further include an antireflection layer on the surface of the optical adjustment layer 3. The antireflection layer may have a single-layer structure composed of a film of material having a lower refractive index than that of the optical adjustment layer 3, or a multi-layer structure composed of a film of material having a lower refractive index and a film of material having a higher refractive index than that of the optical adjustment layer 3. Examples of materials to be used as the antireflection layer include resins, composite materials of a resin and inorganic particles, thin inorganic films formed by vacuum evaporation, sputtering, CVD technique, etc., and the like. Examples of inorganic particles to be used in a composite material as the antireflection layer include silica, alumina, magnesium oxide, and the like having a low refractive index.

Moreover, the diffractive optical element 21 may have nanostructure antireflection shapes on the surface of the optical adjustment layer 3. Nanostructure antireflection shapes can be easily formed by a transfer technique using a mold (nanoimprint), for example.

Furthermore, on the surface of the optical adjustment layer 3 or the antireflection layer, the diffractive optical element 21 may additionally include a surface layer having an action of adjusting dynamic properties such as abrasion resistance or thermal expansion.

Thus, in accordance with the diffractive optical element 21 of the present embodiment, the difference in solubility parameter between the first resin contained in the first optical material composing the body and the second resin contained in the second optical material composing the optical adjustment layer is equal to or greater than $0.8 \ [\text{cal/cm}^3]^{1/2}$, whereby the interaction at the interface between the body 1 and the optical adjustment layer 3 is reduced. As a result, deformation of the diffraction grating and fluctuation in the refractive index of the body due to permeation of the optical adjustment layer 3 into the body 1 are suppressed, thus making it possible to obtain a diffractive optical element which can attain a high diffraction efficiency and convergence characteristics as desired.

(Second Embodiment)

Figure 6:
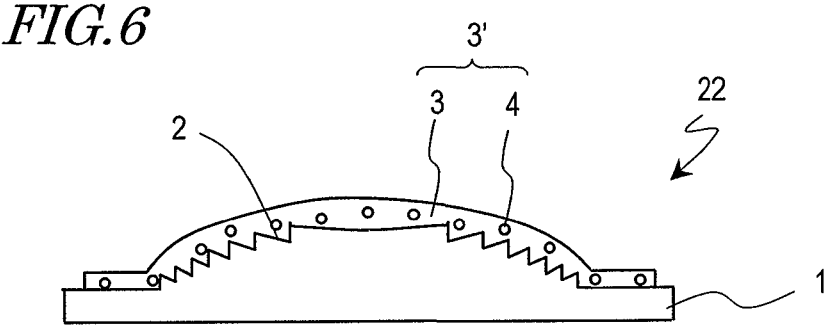
[FIG. 6] A cross-sectional view of a second embodiment of the diffractive optical element according to the present invention.

FIG. 6 is a cross-sectional view showing a second embodiment of the diffractive optical element according to the present invention. As shown in FIG. 6, a diffractive optical element 22 includes a body 1 and an optical adjustment layer 3'.

Similarly to the first embodiment, the body 1 is composed of a first optical material containing a first resin, and has a diffraction grating 2 on its surface. The diffraction grating 2 has a similar structure to that of the first embodiment.

A second optical material composing the optical adjustment layer 3' contains a second resin 3 and inorganic particles 4. The second resin 3 and the inorganic particles 4 together compose a composite material such that the inorganic particles 4 are dispersed in a matrix of the second resin 3. The difference in solubility parameter between the first resin and the second resin 3 is equal to or greater than $0.8 \ [\text{cal/cm}^3]^{1/2}$.

By using the composite material in which the inorganic particles 4 are dispersed in a matrix of the second resin 3, it becomes possible to adjust the refractive index and Abbe number of the second optical material, and by using the second optical material having an appropriate refractive index and Abbe number for the optical adjustment layer 3', it becomes possible to improve the diffraction efficiency in a wavelength band in which the diffractive optical element is used.

Moreover, by dispersing the inorganic particles 4 having a high refractive index in the second resin 3, it becomes possible for the second optical material to have a high refractive index that cannot be attained with only a resin. Therefore, the refractive index difference between the first optical material and the second optical material can be broadened, which makes it possible to reduce the depth of the diffraction grating 2, as is clear from eq. (1). As a result, in the case where the body 1 is produced by molding, the diffraction grating 2 will have an improved transferability. Moreover, since the stepped portions of the diffraction grating 2 can be made shallow, transfer is still easy even when the intervals between the stepped portions are narrowed. This allows for an improvement in diffraction performance based on a narrower pitch of the diffraction grating 2. Furthermore, it becomes possible to use a material having various physical characteristics for the second resin, and reconciliation with characteristics other than optics is more facilitated.

Presumably, when components in the optical adjustment layer 3' permeate the body 1, components in the optical adjustment layer 3' intrude through gaps between molecular chains at the amorphous portions, i.e., portions at which polymer chains are irregularly entangled, within the resin that is contained in the body 1. At this time, if components in the optical adjustment layer 3' have a high affinity with the body 1, the intermolecular force acting between the entangled molecular chains of the first resin in the body 1 becomes reduced as the permeation progresses, whereby gaps between molecular chains of the first resin in the body 1 are broadened, thus further promoting permeation of the components in the optical adjustment layer 3'.

The size of the gaps occurring between molecular chains of the first resin in the body 1 is presumably determined by the molecular structure and molecular weight of the first resin contained in the body 1, alignment ability of the molecules, strain occurring at the time of processing, and the like. As for commonly-used resin materials, it has been experimentally demonstrated that their packing factors, defined as a ratio between a Van der Waals volume of molecular chains and a specific volume substantially occupied by the molecular chains, are approximately 0.68. From this, it can be expemoldntly inferred that an average size of gaps between molecular chains of the first resin will be about 0.18 times the diameter of the molecular chains if the molecular chains have a linear structure $(=1-(0.68)^{1/2})$, and about 0.12 times their diameter if they have a spherical structure $(=1-(0.68)^{1/3})$.

For example, in the case of a bisphenol A-type polycarbonate resin, which takes a linear structure, the diameter of its molecular chains is about 0.6 nm, so that an average size of the gaps between molecular chains is about 0.1 nm. However, it is presumable that the gap size actually has a broad distribution due to influences of higher-order structures and the like, such that gaps which permit permeation of the components in the optical adjustment layer 3 are also created.

The inorganic particles 4 which are dispersed in the composite material have an effective particle size of no less than 1 nm and no more than 100 nm as described later. Therefore, they are sufficiently large relative to the gaps between molecular chains of the first resin in the body 1. Thus, there is a very low possibility that the inorganic particles 4 permeate the first resin contained in the body 1. From this standpoint, in the case where a composite material is used as the optical adjustment layer 3', a construction should be realized in which the second resin, which is the matrix resin, does not permeate the resin composing the body 1, i.e., the first resin.

Specifically, when the difference between the solubility parameter of the first resin contained in the first optical material composing the body 1 and the solubility parameter of the second resin contained in the second optical material composing the optical adjustment layer 3' is smaller than 0.8 $[cal/cm^3]^{1/2}$, a phenomenon will occur where the second resin of the body 1 permeates the first resin and dissolves the body 1 if there is a high affinity between the second resin and the first resin, thus deteriorating the diffraction efficiency of the resultant diffractive optical element at the designed order. Therefore, as has been described in detail in the first embodiment, it is more preferable that the difference between the solubility parameter of the first resin contained in the first optical material and the solubility parameter of the second resin contained in the second optical material is in the range of no less than 0.8 $[cal/cm^3]^{1/2}$ and no more than 2.5 $[cal/cm^3]^{1/2}$.

As the second resin to function as the matrix resin, the second resins that have been described in the first embodiment can be suitably used. Among them, a material may be selected that satisfy the dispersiveness of the inorganic particles 4, the physical characteristics and environmental resistance required of the optical adjustment layer 3, ease of handling in the production steps, and the like. In particular, as has been described in the first embodiment, it is preferable to use a thermosetting resin or an energy beam-curing resin as the second resin. It is particularly preferable to use that with a solubility parameter which is greater than the solubility parameter of the first resin by 0.8 $[cal/cm^3]^{1/2}$ or more, and more preferably that which has an OH group.

In the case where a first optical material containing the first resin is used for the body 1 and a composite material containing the second resin 3 and the inorganic particles 4 is used as a second optical material composing the optical adjustment layer 3', it is generally the case that the inorganic particles 4 have a higher refractive index than those of the resins. Therefore, it is preferable that the second optical material has a higher refractive index and a lower wavelength dispersion than those of the first optical material, because then there will be more materials to choose from as the inorganic particles 4. In other words, it is preferable that the first optical material has a lower refractive index and a higher dispersiveness than those of the second optical material.

The refractive index of the second optical material as the composite material can be inferred based on the Maxwell-Garnett theory expressed by eq. (2) below, from the refractive indices of the second resin as the matrix resin and the inorganic particles 4, for example.

In eq. (2), $n_{COM}\lambda$ is an average refractive index of the second optical material at a given specific wavelength $\lambda$, whereas $n_p\lambda$ and $n_m\lambda$ are the refractive indices of the inorganic particles and second resin at this wavelength $\lambda$. P is a volumetric ratio of the inorganic particles relative to the entire second optical material. In eq. (2), by inferring the refractive indices at Fraunhofer's D line (589.2 nm), F line (486.1 nm), and C line (656.3 nm) as the wavelengths $\lambda$, it is possible to further infer the Abbe number of the composite material. Conversely, the mixing ratio between the second resin 3 and the inorganic particles 4 may be determined through an inference based on this theory.

[Eq. 2]

$$n_{COM\lambda}^2 = \frac{n_{p\lambda}^2 + 2n_{m\lambda}^2 + 2P(n_{p\lambda}^2 + 2n_{m\lambda}^2)}{n_{p\lambda}^2 + 2n_{m\lambda}^2 - P(n_{p\lambda}^2 + 2n_{m\lambda}^2)} n_{m\lambda}^2 \quad (2)$$

Note that, in the case where the inorganic particles 4 absorb light or the inorganic particles 4 include a metal in eq. (2), the refractive index of eq. (2) is to be calculated as a complex refractive index. Note that eq. (2) is an equation which holds true when $n_p\lambda \geq n_m\lambda$. When $n_p\lambda < n_m\lambda$, the refractive index is to be inferred by using eq. (3) below.

[Eq. 3]

$$n_{COM\lambda}^2 = \frac{n_{m\lambda}^2 + 2n_{p\lambda}^2 + 2(1-P)(n_{m\lambda}^2 + 2n_{p\lambda}^2)}{n_{m\lambda}^2 + 2n_{p\lambda}^2 - (1-P)(n_{m\lambda}^2 + 2n_{p\lambda}^2)} n_{p\lambda}^2 \quad (3)$$

As described above, in the case where a second optical material made of a composite material is used for the optical adjustment layer 3', it is necessary that the second optical material has a higher refractive index than that of the first optical material and a lower wavelength dispersion than that of the first optical material. Therefore, it is preferable that the main component of the inorganic particles 4 to be dispersed in the second resin is also a material having a low wavelength dispersion, i.e., a high Abbe number. Particularly, in the case where a polycarbonate-type resin is used as the first resin, it is preferable that a material having an Abbe number of 30 or more is the main component of the inorganic particles 4. It is particularly preferable that the main component is at least one oxide selected from the group consisting of zirconium oxide (Abbe number: 35), yttrium oxide (Abbe number: 34), lanthanum oxide (Abbe number: 35), hafnium oxide (Abbe number 32), scandium oxide (Abbe number: 27), alumina (Abbe number: 76), and silica (Abbe number: 68), for example. Alternatively, a complex oxide thereof may be used. So long as eq. (1) is satisfied in the light wavelength band in which the diffractive optical element 22 is used, inorganic particles exhibiting a high refractive index, such as titanium oxide and zinc oxide, may be allowed to coexist with these inorganic particles.

It is preferable that the effective particle size of the inorganic particles 4 is no less than 1 nm and no more than 100 nm. When the effective particle size is 100 nm or less, losses due to Rayleigh scattering can be reduced, and the transparency of the optical adjustment layer 3' can be enhanced. When the effective particle size is 1 nm or more, influences of light emission due to a quantum effect and the like can be suppressed. As necessary, the second optical material may contain additives such as a dispersant for improving the dispersiveness of the inorganic particles, a polymerization initiator, and a leveling agent.

Figure 11:
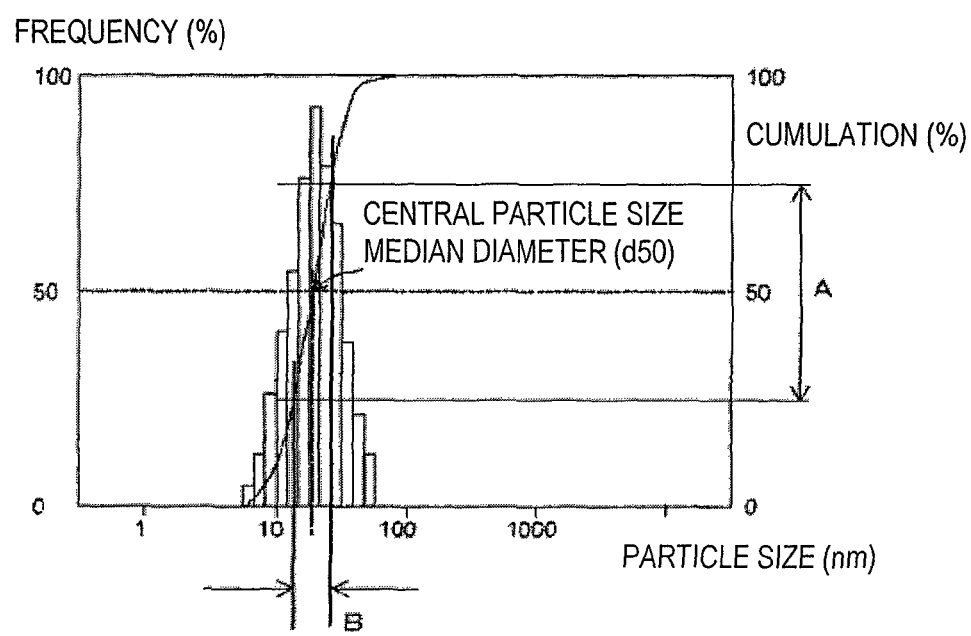
[FIG. 11] A graph for describing a definition of an effective particle size of particles.

Now, the effective particle size will be described with reference to FIG. 11. In FIG. 11, the horizontal axis represents particle size of inorganic particles, whereas the left vertical axis represents frequency of inorganic particles with respect to the particle size on the horizontal axis. The right vertical axis represents cumulative frequency of particle sizes. An effective particle size refers to, in a particle size frequency distribution of the entirety of inorganic particles, a range B of particle sizes whose cumulative frequency falls within a range A of 50% around a central particle size, the central particle size being defined as a particle size whose cumulative frequency is 50% (median diameter: d50). Therefore, it is preferable that the range of the effective particle size of the inorganic particles 4 thus defined is in the range of no less than 1 nm and no more than 100 nm. In order to accurately determine an effective particle size value, it is preferable to measure 200 or more inorganic particles, for example.

In the case where a second optical material made of a composite material is used for the optical adjustment layer 3', the stepped portions of the diffraction grating 2 can be made shallow, and the optical adjustment layer 3' to be formed so as to cover the diffraction grating 2 can also be made thin. As a result, Rayleigh scattering within the optical adjustment layer 3' caused by the inorganic particles 4 is reduced, whereby a diffractive optical element 22 with even smaller optical losses can be realized. In the case where a composite material is used as the second optical material composing the optical adjustment layer 3', the depth d (stepped portion) of the diffraction grating 2 is preferably 20 μm or less, and the thickness of the optical adjustment layer 3' is preferably no less than the depth d of the diffraction grating 2 and no more than 200 μm at the thickest portion, and particularly preferably no less than the depth d and no more than 100 μm.

In the case where a second optical material made of a composite material having a high refractive index and a low wavelength dispersion is used for the optical adjustment layer 3', the first resin of the first optical material composing the body 1 needs to have a low refractive index and a high wavelength dispersion. Therefore, for the first resin, it is preferable to use a polycarbonate-type resin having a relatively low Abbe number among optical resins, especially an aromatic polycarbonate-type resin. Within a range satisfying eq. (1) with respect to the second optical material, a polycarbonate-type resin may be allowed to copolymerize with another resin, alloyed with another resin, or another resin may be blended thereto, thus being used as the first optical material. The first optical material may contain additives.

Note that the diffractive optical element 22 may further include an antireflection layer on the surface of the optical adjustment layer 3'. The antireflection layer may have a single-layer structure composed of a film of material having a lower refractive index than that of the optical adjustment layer 3', or a multi-layer structure composed of a film of material having a lower refractive index and a film of material having a higher refractive index than that of the optical adjustment layer 3'. Examples of materials to be used as the antireflection layer include resins, composite materials of a resin and inorganic particles, thin inorganic films formed by vacuum evaporation, sputtering, CVD technique, etc., and the like. Examples of inorganic particles to be used in a composite material as the antireflection layer include silica, alumina, magnesium oxide, and the like having a low refractive index.

Moreover, the diffractive optical element 22 may have nanostructure antireflection shapes on the surface of the optical adjustment layer 3'. Nanostructure antireflection shapes can be easily formed by a transfer technique (nanoimprint) using a mold, for example.

Furthermore, on the surface of the optical adjustment layer 3' or the antireflection layer, the diffractive optical element 22 may additionally include a surface layer having an action of adjusting dynamic properties such as abrasion resistance or thermal expansion.

Thus, in accordance with the diffractive optical element 22 of the present embodiment, the difference in solubility parameter between the first resin contained in the first optical material composing the body 1 and the second resin, i.e., the matrix resin in the composite material which is the second optical material composing the optical adjustment layer, is 0.8 $[cal/cm^3]^{1/2}$ or more, whereby the interaction at the interface between the body 1 and the optical adjustment layer 3 is reduced. As a result, deformation of the diffraction grating and fluctuation in the refractive index of the body due to permeation of the optical adjustment layer 3 into the body 1 are suppressed, and a diffractive optical element which can achieve a high diffraction efficiency and convergence characteristics as desired can be obtained. In particular, since a composite material is used as the second optical material, the stepped portions of the diffraction grating can be made shallow, whereby processing of the body 1 having the diffraction grating 2 is facilitated and the pitch of the diffraction grating can be narrowed, thus enabling improvements in diffraction performance.

(Third Embodiment)

Hereinafter, an embodiment of a production method of the diffractive optical element according to the present invention will be described. In the present embodiment, with reference to FIGS. 7(a) to (f) and FIGS. 8(a) to (d), a method of producing the diffractive optical element 21 of the first embodiment will be described.

First, as shown in FIG. 7(a), a body 1 having a diffraction grating 2 formed on its surface is provided. For example, the body 1 having the diffraction grating 2 formed thereon can be produced by: a method of performing molding by supplying a first optical material in a softened or melted state into a mold in which a diffraction grating shape has been formed, such as injection molding or press forming; a method of injecting a monomer, oligomer, or the like as a raw material of the first optical material into a mold in which a diffraction grating shape has been formed, and polymerizing the raw material via heating and/or energy beam irradiation; a method of, on the surface of a body 1 which has been molded in advance, molding the diffraction grating 2 by cutting, polish, etc.; and so on. The body 1 having the diffraction grating 2 formed thereon can also be produced by any method other than these.

Next, a raw material of the second optical material is provided, containing a raw material of a second resin whose solubility parameter differs from that of the body 1 by 0.8 $[cal/cm^3]^{1/2}$ or more, and is placed on the diffraction grating 2 on the body 1. The second optical material has a higher refractive index and a lower dispersiveness than those of the first optical material. In the case where a thermosetting resin or an energy beam-curing resin as described in the first embodiment or the second embodiment is used as the second optical material, the monomer or oligomer of the second optical material will hereafter be in contact with the body 1 until the raw material is cured. Therefore, it is preferable to use a monomer or oligomer (being the raw material of the second resin) whose solubility parameter before curing or before polymerization differs from the solubility parameter of the first resin contained in the first optical material of the body 1 by 0.8 $[cal/cm^3]^{1/2}$ or more, thus suppressing permeation into the body 1, and preventing deteriorations in characteristics due to swelling or dissolution of the diffraction grating 2 or formation of an altered-refractive index layer.

The method of placing the raw material of the optical adjustment layer 3 on the diffraction grating 1 on the body 1 is to be appropriately selected from among known processes of coating layer formation, depending on material characteristics such as viscosity, and shape precision of the optical adjustment layer 3 as determined from the optical characteristics required of the diffractive optical element. As a specific example, FIGS. 7(a) to (f) illustrate a transfer positioning of a raw material 13 of the optical adjustment layer 3 using pad printing. However, application by using an injection nozzle such as a dispenser, immersion application such as dip-coating, spray application such as spray-coating or ink jet technique, rotation-based application such as spin coating, squeezing-based application such as screen printing, or the like may be used. These processes may be combined as appropriate. This is also true of the Examples below.

The steps of using pad printing to place the raw material of the optical adjustment layer 3 on the diffraction grating 1 of the body 1 will be as follows. First, a pad 14 is pressed against the raw material 13 of the optical adjustment layer, which is placed on a pattern 12 on a plate 11 of pad printing. Next, as shown in FIG. 7(b), the pad 14 is lifted up, whereby the raw material 13 of the optical adjustment layer is transferred onto the pad 14.

Next, after moved over the body 1 as shown in FIG. 7(c), the pad 14 is pressed against the body 1 to transfer the raw material 13 of the optical adjustment layer onto the body 1 as shown in FIG. 7(d), and thereafter the pad 14 is lifted up as in FIG. 7(e).

Thereafter, in the case where a thermosetting resin or an energy beam-curing resin is used for the second resin of the second optical material, the raw material of the second resin contained in the raw material 13 is cured. As the method of curing the raw material of the second resin, a step such as thermosetting or energy beam irradiation can be used depending on the type of the resin used. Examples of energy beams to be used for the curing step include ultraviolet, visible light, infrared, and an electron beam. In the case of performing a ultraviolet cure, a photopolymerization initiator may be added to the raw material 13 in advance. In the case of performing electron beam curing, no polymerization initiator is usually required. By curing the raw material of the second resin, the entire raw material 13 becomes cured, whereby the diffractive optical element 21 is completed in which the optical adjustment layer 3 is provided on the surface of the body 1 having the diffraction grating 2, as shown in FIG. 7(f).

Note that, for the shape precision required of the optical adjustment layer 3, especially in the case where its face away from the diffraction grating 2 needs to be molded into shape with a high precision, a mold may be used in the curing step to control the shape of the optical adjustment layer 3 with a higher molding precision. For example, as shown in FIG. 8(a), the body 1 having the diffraction grating 2 formed thereon is provided, and as shown in FIG. 8(b), the raw material 13 of a thermosetting resin or an energy beam-curing resin is dropped onto the body 1 from a dispenser 6. Then, as shown in FIG. 8(c), a mold 8 is pressed against the raw material 13, and the mold 8 is placed on the body 1 so as to cover the raw material 13. The material of the mold 8 can be appropriately selected according to the required shape precision and durability. For example, iron or aluminum, an alloy thereof, a metal such as brass, or the like may be used. As necessary, a metal which has been subjected to a surface treatment such as nickel plating may be used. Moreover, it is also possible to use quartz or glass, or resins such as epoxy resin, polyester resin, and polyolefin resin as the material of the mold 8.

In the case of molding the optical adjustment layer 3 into shape by using the mold 8, the raw material 13 of the optical adjustment layer 3 may be placed inside the mold 8 and thereafter pressed against the body 1. However, since the raw material 13 before curing has a low viscosity, it is likely to move over to the body 1 having the diffraction grating 2 formed on its surface; it is more preferable to place the raw material 13 directly on the body 1 because inclusion of air voids or the like will be suppressed and because the closeness of contact between the optical adjustment layer 3 and the body 1 after curing will be enhanced.

In the case of restricting the shape of the optical adjustment layer 3 by using the mold 8, it is commonplace to conduct a release after the curing step. However, so long as the raw material 13 does not deform before curing, a release may be conducted first and then the raw material of the second resin contained in the raw material 13 may be cured. In the case where a release is conducted after curing via energy beam irradiation, the raw material of the second resin contained in the raw material 13 is irradiated with an energy beam while the raw material 13 is being restricted by the mold 8. In the case where an opaque material such as a metal is used as the mold 8, as shown in FIG. 8(c), an energy beam is radiated from a face of the body 1 that is opposite from the face on which the raw material 13 is placed. On the other hand, in the case where a material which is transparent with respect to the energy beam is used as the mold 8, e.g., when ultraviolet is used as the energy beam and the mold 8 is composed of quartz or the like, the raw material of the second resin contained in the raw material 13 can be irradiated with the energy beam through the mold 8, from the face of the body 1 on which the raw material 13 is placed, thus curing the second resin. By curing the raw material of the second resin, the entire raw material 13 becomes cured. Thereafter, the mold 8 is removed from the cured raw material 13, whereby the diffractive optical element 21 is completed in which the optical adjustment layer 3 is formed on the surface of the body 1, as shown in FIG. 8(d).

Thus, in accordance with the production method of the diffractive optical element of the present embodiment, the difference in solubility parameter between the first resin contained in the first optical material composing the body 1 and the raw material of the second resin contained in the second optical material composing the optical adjustment layer 3 is 0.8 $[cal/cm^3]^{1/2}$ or more, whereby the interaction at the interface between the body 1 and the raw material of the second resin in the midst of production of the diffractive optical element is reduced, and permeation of the raw material of the second resin into the body 1 is suppressed. This prevents the shape of the diffraction grating 2 formed on the surface of the body 1 from being deformed and a layer with a different refractive index on the surface of the body 1 from being formed in the midst of production of the diffractive optical element. Moreover, since the difference between the solubility parameter of the optical adjustment layer 3 composed of the raw material of the second resin via polymerization or curing and the solubility parameter of the first resin contained in the first optical material composing the body 1 is also 0.8 $[cal/cm^3]^{1/2}$ or more, deformation of the diffraction grating and fluctuation in the refractive index of the body due to permeation of the optical adjustment layer 3 into the body 1 in the completed diffractive optical element are suppressed, and a diffractive optical element which can achieve a high diffraction efficiency and convergence characteristics as desired can be obtained.

(Fourth Embodiment)

Hereinafter, another embodiment of the production method of the diffractive optical element according to the present invention will be described. In the present embodiment, with reference to FIGS. 7(a) to (f) and FIGS. 8(a) to (d), a method of producing the diffractive optical element 22 of the second embodiment will be described. The present embodiment illustrates a production method in the case of using a composite material as the second optical material will be described.

As has been described in the second embodiment, in the case where the optical adjustment layer is formed by using a composite material, the second optical material composing the optical adjustment layer contains a second resin and inorganic particles. Before the optical adjustment layer is formed, the second optical material may contain a solvent. The solvent is used in order to allow inorganic particles to be uniformly dispersed in the second resin or the raw material of the second resin, or adjust the viscosity of the second resin or the raw material of the second resin to form an optical adjustment layer 3 which is free of air voids.

The solvent contained in the second optical material is removed through a subsequently-described drying step. Therefore, it is presumable that the solvent has a shorter time of contact with the body 1 than does the raw material of the second resin, so that the solvent has less interaction with the first resin than does the raw material of the second resin. However, from the standpoint of suppressing permeation of foreign matter into the body 1 and preventing deformation of the diffraction grating and generation of an altered-refractive index layer, as for the solvent too, it is preferable to use a solvent having a solubility parameter which differs from the solubility parameter of the body 1 by $0.8\ [\mathrm{cal/cm^3}]^{1/2}$ or more, similarly to the monomer or oligomer which is the raw material of the second resin. Moreover, in order to enhance the closeness of contact between the raw material of the second resin layer containing the solvent and the body 1 composed of the first resin in the production steps of the diffractive optical element 22 and ensure producibility, the difference in solubility parameter between the solvent and the first resin is preferably no less than $0.8\ [\mathrm{cal/cm^3}]^{1/2}$ and no more than $2.5\ [\mathrm{cal/cm^3}]^{1/2}$, and more preferably no less than $0.8\ [\mathrm{cal/cm^3}]^{1/2}$ and no more than $2.3\ [\mathrm{cal/cm^3}]^{1/2}$. From among solvents having such a solubility parameter, one that satisfies the required characteristics, e.g., dispersiveness of the inorganic particles, solubility of the matrix resin, and ease of handling in the production steps (such as viscosity adjustability, wettability with respect to the body, ease of drying (boiling point, vapor pressure)), may be selected.

Especially, in the case where a thermosetting resin or an energy beam-curing resin is used as the second resin to become the matrix resin, as described above, the solubility parameter of the second resin is greater than the solubility parameter of the first resin of the first optical material composing the body 1. Therefore, in order to ensure solubility of the second resin, it is preferable that the solvent also has a solubility parameter which is greater than the solubility parameter of the first resin by $0.8\ [\mathrm{cal/cm^3}]^{1/2}$ or more. For example, in the case where bisphenol A-type polycarbonate (SP value: 9.8) is used as the first resin of the body 1, an alcohol-type solvent such as methanol (SP value: 14.5), ethanol (SP value: 12.7), 2-propanol (SP value: 11.5), 1-propanol (SP value: 11.9), or 1-butanol (SP value: 11.4), a glycol-type solvent such as ethylene glycol (SP value: 14.6) or methyl cellosolve (SP value: 11.4), water (SP value: 23.4), or other solvents can be used. These solvents are relatively easy to obtain and handle, which is another reason why they are preferable.

As has been described in the second embodiment, there is a very low possibility for the inorganic particles in the second optical material to permeate the body 1. For this reason, by using a composite material as the second optical material composing the optical adjustment layer, the chances that low-molecular weight components, such as the monomer or oligomer which is the raw material of the second resin and the solvent, come in contact with the body 1 during the production steps are relatively reduced. As a result, permeation of the low-molecular weight component contained in the second optical material into the body 1 is further suppressed.

Next, a production method of the diffractive optical element 22 (second embodiment) will be described.

Figure 7:
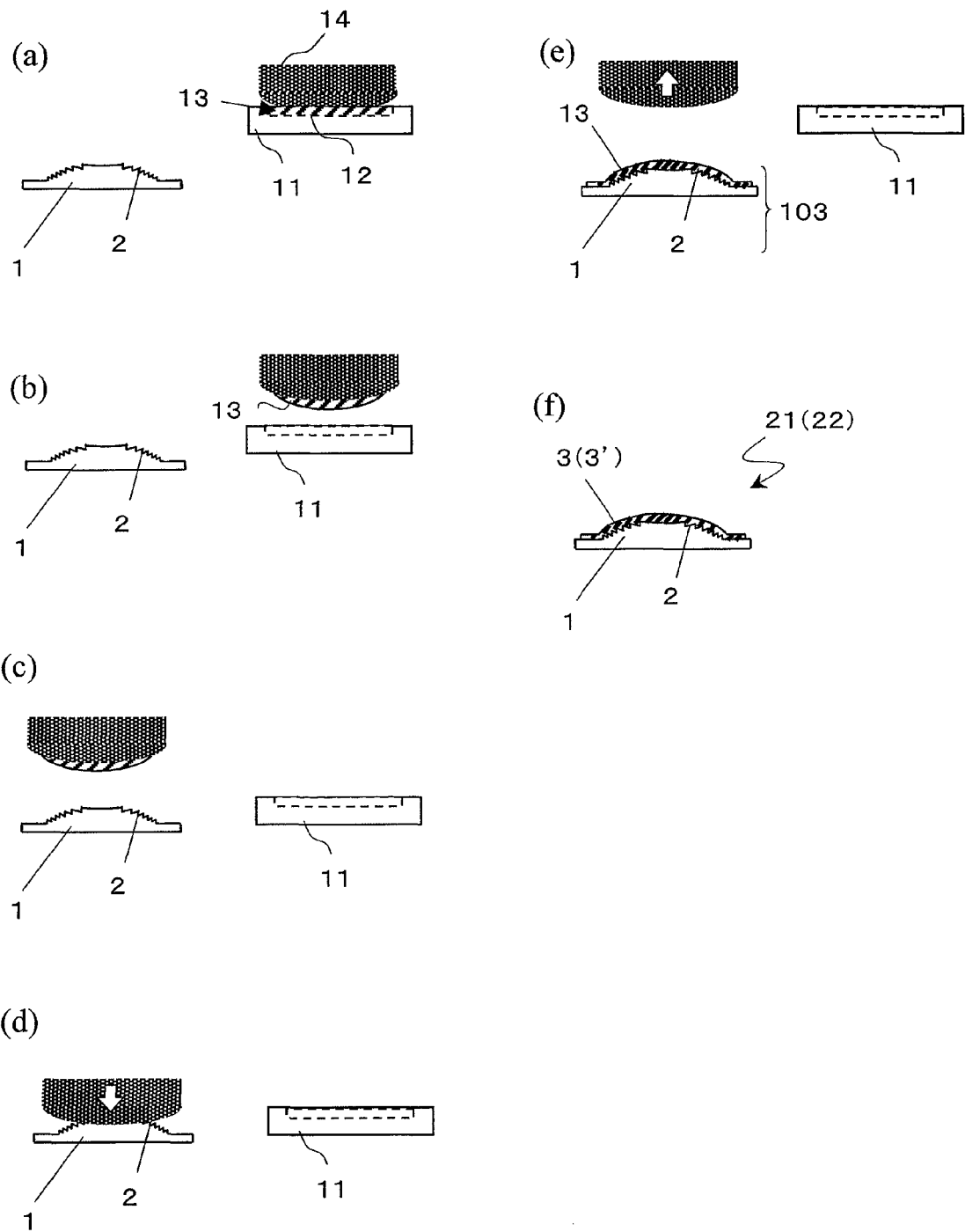
[FIG. 7] (a) to (f) are step-by-step cross-sectional views for describing a production method of the diffractive optical element according to the present invention.

Similarly to the third embodiment, as shown in FIG. 7(*a*), the body 1 having the diffraction grating 2 formed on its surface is produced first. Next, the raw material 13 of the second optical material to become the optical adjustment layer 3' is placed on the body 1, as shown in FIGS. 7(*b*) to (*e*). These steps are so far identical to those in the production method of the third embodiment.

Next, the raw material 13 is dried in order to remove the solvent in the raw material 13. For removal of the solvent, methods such as ustulation and drying under reduced pressure can be used. The drying temperature, pressure, time, and the like need to be adjusted according to the composition of the raw material 13 used (e.g., type of the solvent, polarity of the second resin, amount of solvent contained in the raw material 12) as appropriate. If any solvent remains, it will cause fluctuations in the refractive index of the optical adjustment layer 3', and therefore the solvent needs to be removed substantially completely, to an extent that fluctuations in the refractive index do not occur.

After the solvent is removed, the raw material of the second resin contained in the raw material 13 is cured, as has been described in the third embodiment. Similarly to the third embodiment, the cure method can be performed with heat or energy beam irradiation. By curing the raw material of the second resin, the entire raw material 13 is cured. As a result, as shown in FIG. 7(*f*), the diffractive optical element 22 is completed in which the optical adjustment layer 3' made of a composite material is formed on the surface of the body 1 having the diffraction grating 2.

Similarly to the third embodiment, for the shape precision required of the optical adjustment layer 3', especially in the case where its face away from the diffraction grating 2 needs to be molded into shape with a high precision, a mold may be used in the curing step to control the shape of the optical adjustment layer 3' with a higher molding precision. In this case, as has been described in the third embodiment with reference to FIGS. 8(*a*) to (*d*), the raw material 13 of the optical adjustment layer 3' is placed on the body 1, and after removing the solvent, a mold 8 may be pressed against the raw material 13 to mold the raw material 13 into a desired shape.

Figure 8:
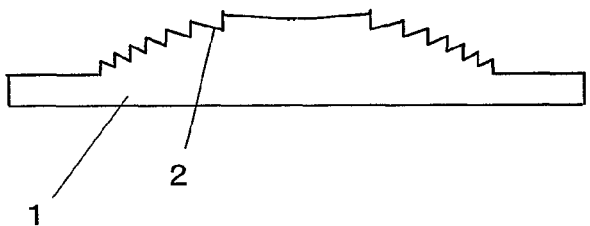
[FIG. 8] (a) to (d) are step-by-step cross-sectional views for describing another production method of the diffractive optical element according to the present invention.
Figure 8:
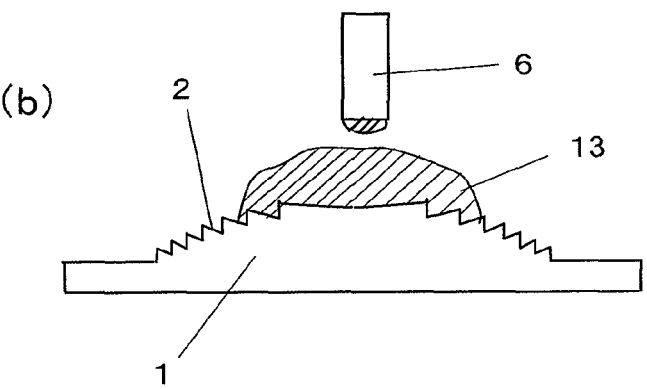
Figure 8:
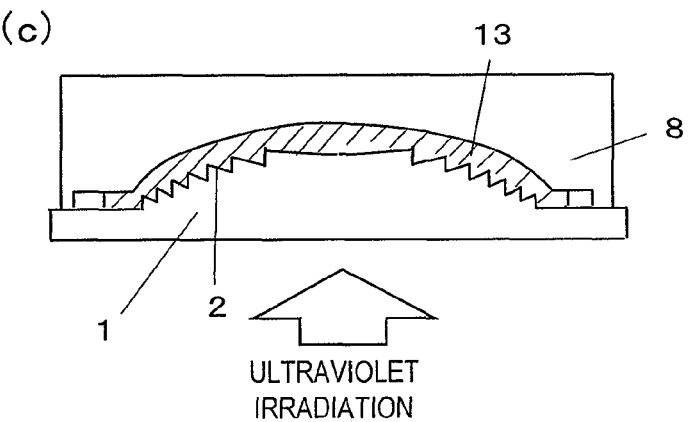
Figure 8:
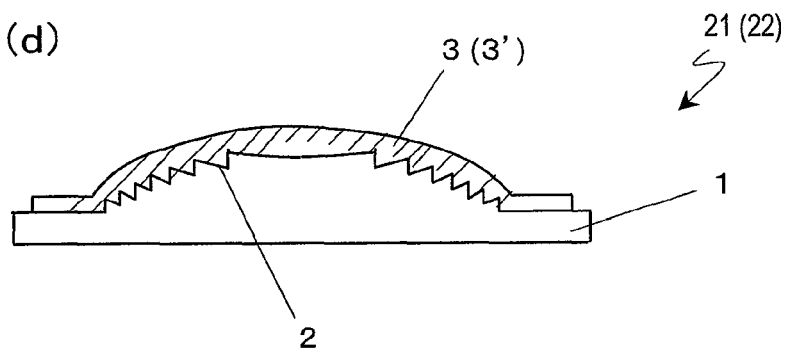

In the case of molding the optical adjustment layer 3' into shape by using the mold 8, the raw material 13 of the optical adjustment layer 3' may be placed in the mold 8, and after removing the solvent from the raw material 13, the raw material 13 may be pressed against the body 1. However, as has been described with respect to the third embodiment, it is more preferable to place the raw material 13 of the optical adjustment layer 3' on the body 1. As a result, as shown in FIG. 8(*d*), the diffractive optical element 22 is completed in which the optical adjustment layer 3' is formed on the surface of the body 1.

Thus, in accordance with the production method of the diffractive optical element of the present embodiment, the difference in solubility parameter between the first resin contained in the first optical material composing the body 1 and the raw material 13 of the second resin contained in the second optical material composing the optical adjustment layer 3' as well as the solvent contained in the raw material 13 is $0.8\ [\mathrm{cal/cm^3}]^{1/2}$ or more, whereby the interaction at the interface between the body 1 and the raw material of the second resin in the midst of production of the diffractive optical element is reduced, and permeation of the raw material of the second resin and the solvent into the body 1 is suppressed. This prevents the shape of the diffraction grating 2 formed on the surface of the body 1 from being deformed and a layer with a different refractive index on the surface of the body 1 from being formed in the midst of production of the diffractive optical element. Moreover, since the difference between the solubility parameter of the optical adjustment layer 3 composed of the raw material of the second resin via polymerization or curing and the solubility parameter of the first resin contained in the first optical material composing the body 1 is also 0.8 $[cal/cm^3]^{1/2}$ or more, deformation of the diffraction grating and fluctuation in the refractive index of the body due to permeation of the optical adjustment layer 3' into the body 1 in the completed diffractive optical element are suppressed, and a diffractive optical element which can achieve a high diffraction efficiency and convergence characteristics as desired can be obtained. In particular, since a composite material is used as the second optical material, the stepped portions of the diffraction grating can be made shallow, whereby processing of the body 1 having the diffraction grating 2 is facilitated and the pitch of the diffraction grating can be narrowed, thus enabling improvements in diffraction performance.

EXAMPLES

Hereinafter, results of producing diffractive optical elements according to the present invention and evaluating their characteristics will be specifically described.

Example 1

Figure 5:
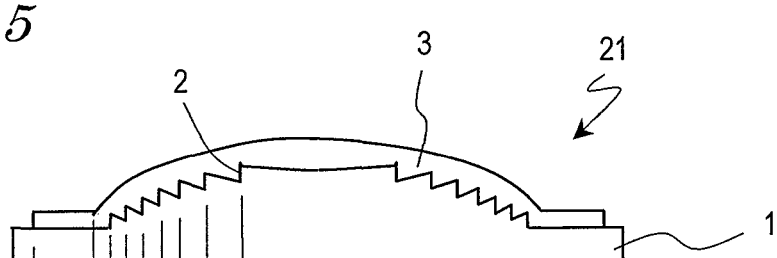
[FIG. 5] (a) and (b) are a cross-sectional view and an upper plan view of a first embodiment of the diffractive optical element according to the present invention.
Figure 5:
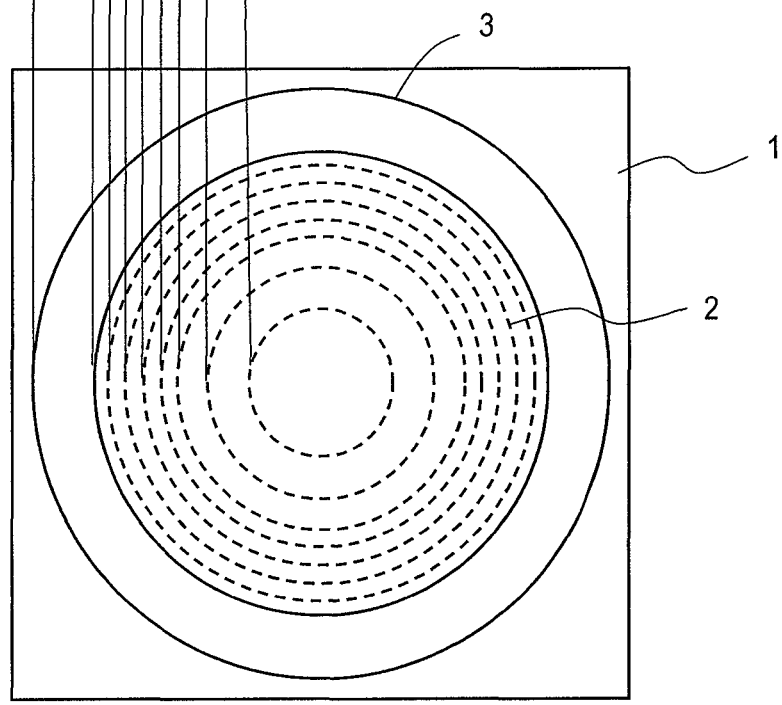

A diffractive optical element 21 having the structure shown in FIG. 5 was produced by the following method. The diffractive optical element 21 has a lens action, and is designed so as to utilize $1^{st}$ order diffracted light. This is also true of the following Examples.

First, as the first resin of the first optical material composing the body 1, bisphenol A-type polycarbonate resin (d-line refractive index: 1.585; Abbe number: 28; SP value: 9.8 $[cal/cm^3]^{1/2}$) was injection-molded, thus producing a body 1 having an annular diffraction grating 2 with a depth of 39 μm on one face, in which the foot of the diffraction grating had an aspherical envelope. The effective radius of the lens portion was 0.828 mm; the number of rings was 29; the smallest ring pitch was 14 μm; and the diffraction surface had a paraxial R (radius of curvature) of −1.0144 mm.

Next, epoxy acrylate resin C (d-line refractive index: 1.600; Abbe number: 33; SP value: 11.2 $[cal/cm^3]^{1/2}$) to become the second resin of the second optical material composing the optical adjustment layer 3 was applied onto the entire face of the annular diffraction grating 2 of the body 1 by using a pad printer (SPACE PAD system manufactured by MISHIMA CO., LTD.). Thereafter, acrylate resin C is cured by being irradiated with ultraviolet (illuminance: 120 mW/cm²; cumulative light amount: 4000 mJ/cm²), thereby forming the optical adjustment layer 3.

The diffraction efficiency of the diffractive optical element 21 produced through the above steps was measured. A light beam from a white light source was transmitted through the diffractive optical element 21, and the maximum luminance at a point of convergence corresponding to each order of diffraction was measured by using a 3D micro-measurement apparatus (manufactured by Mitaka Kohki Co., Ltd.), and a $1^{st}$ order diffraction efficiency was calculated through a calculation expressed by eq. (4) below. Note that, in the following Examples and Comparative Examples, no higher-order diffracted light was detected that was $3^{rd}$ order diffracted light or above.

[Eq. 4]

$$(1^{st} \text{ order diffraction efficiency}) = \frac{(\text{luminance of } 0^{th} \text{ order diffracted light})}{\{(\text{luminance of } 0^{th} \text{ order diffracted light} + \text{luminance of } 1^{st} \text{ order diffracted light} + \text{luminance of } 2^{nd} \text{ order diffracted light})\}} \quad (4)$$

The $1^{st}$ order diffraction efficiency of the diffractive optical element 21 of the present Example was 87% or more at all wavelengths. Note that, for general use, a diffractive optical element will be sufficiently practical if its $1^{st}$ order diffraction efficiency is 85% or more.

Furthermore, the diffractive optical element of the present Example was cut in a cross section through which its optical axis extended, and the border portion between the body 1 and the optical adjustment layer 3 was observed with an optical microscope, which revealed no change or degradation of the diffraction grating due to interaction between materials. Moreover, in order to measure a refractive index of the body at the portion where the body adjoined the optical adjustment layer, a film with a thickness of 30 μm was formed with the same material and the same conditions as those of the optical adjustment layer on a flat plate made of the same material as that of the body 1, and the refractive index of the body at the portion where the body adjoined the film was measured to give a refractive index at the d line of 1.585, which is equal to the refractive index at the d line (1.585) in the case where there was no adjoining optical adjustment layer. From this, it was confirmed that the raw material of the optical adjustment layer 3 had not permeated the body 1.

Note that the solubility parameter of the second resin before curing was determined by the method of Fedors et al. of calculating from the molecular structural formula. The solubility parameter of the second resin after curing was also calculated, which was found to be approximately equal to the solubility parameter of the second resin before curing. The solubility parameter of the second resin before curing was similarly calculated also in the following Examples and Comparative Examples.

Example 2

As an Example of the present invention, a diffractive optical element 22 having the structure shown in FIG. 6 was produce by the following method. Similarly to Example 1, as for the body 1, bisphenol A-type polycarbonate resin (d-line refractive index: 1.585; Abbe number: 28; SP value: 9.8 $[cal/cm^3]^{1/2}$) was injection-molded as the first resin, thus producing a body 1 having an annular diffraction grating 2 with a depth of 15 μm on one face, in which the foot of the diffraction grating had an aspherical envelope. The effective radius of the lens portion was 0.828 mm; the number of rings was 29; the pitch of the smallest ring was 14 μm; and the diffraction surface had a paraxial R (radius of curvature) of −1.0144 mm.

Next, the second optical material to become the raw material of the optical adjustment layer 3' was prepared as follows. By using alicyclic acrylate resin B (d-line refractive index: 1.531; Abbe number: 52; SP value: 9.0 $[cal/cm^3]^{1/2}$) as the second resin, a PGME (propylene glycol monomethyl ether; SP value: 10.8 $[cal/cm^3]^{1/2}$) dispersion liquid of zirconium oxide (primary particle size: 3 to 10 nm; effective particle size by light scatter technique: 20 nm; containing silane-type surface treatment agent) was dispersed in this so that the weight ratio of zirconium oxide in the total solid content excluding the dispersion medium, i.e., PGME, was 56 weight %, and was mixed. The optical characteristics of this second optical material after drying and curing were as follows: the refractive index at the d line was 1.623; the Abbe number was 43; and the transmittance of a light beam with a wavelength of 400 to 700 nm was 90% or more (film thickness: 30 μm).

By using a dispenser, 0.4 μL of this second optical material was dropped on the body 1, and after being dried with a vacuum drier (25° C.; internal pressure of the vacuum drier: 1300 Pa; 3 hours), it was placed on a mold (a stainless steel-type alloy with a nickel plating film formed on its surface), and from the rear face (the face opposite to the face on which the composite material was dropped) of the body 1, ultraviolet (illuminance: 120 mW/cm$^2$; cumulative light amount: 4000 mJ/cm$^2$) was radiated, thus curing the second resin. Thereafter, it was released from the mold, and formed into the optical adjustment layer 3'. Note that the optical adjustment layer 3' was formed so that its surface configuration matched the aspherical shape along the envelope shape of the foot of the diffraction grating 2. Moreover, the optical adjustment layer 3' was formed so that its thickness was 30 μm at the thickest portion (i.e., the portion corresponding to the deepest portion of the diffractive optical element).

With a method similar to that of Example 1, the 1$^{st}$ order diffraction efficiency of the diffractive optical element 22 of the present Example was calculated to be 92% at all wavelengths.

Furthermore, the diffractive optical element 22 of the present Example was cut in a cross section through which its optical axis extended, and the border portion between the body 1 and the optical adjustment layer 3' was observed with an optical microscope, which revealed no change or degradation of the diffraction grating 2 due to interaction between materials. Moreover, with the same method as in Example 1, the refractive index of the body at the portion where the body 1 adjoined the optical adjustment layer 3' was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Example 3

As an Example of the present invention, a diffractive optical element 22 having the same construction as that of Example 2 was produced with a method similar to that of Example 2. However, there were differences from Example 2 in that, as the second resin of the second optical material composing the optical adjustment layer 3', a mixed resin was used which was obtained by mixing OH group-containing acrylate resin A (d-line refractive index: 1.529; Abbe number: 50; SP value: 11.5 [cal/cm$^3$]$^{1/2}$) and the same alicyclic acrylate resin B as in Example 2 at a weight ratio of 4:1 and adjusted so that the solubility parameter of the entire resin was 11.1 [cal/cm$^3$]$^{1/2}$, and that 1-propanol (NPA; SP value: 11.9 [cal/cm$^3$]$^{1/2}$) was used as a solvent.

With a method similar to that of Example 1, the 1$^{st}$ order diffraction efficiency of the diffractive optical element 22 of the present Example was calculated to be 85% at all wavelengths.

Furthermore, the diffractive optical element of the present Example was cut in a cross section through which its optical axis extended, and the border portion between the body and the optical adjustment layer was observed with an optical microscope, which revealed no change or degradation of the diffraction grating due to interaction between materials. Moreover, with the same method as in Example 1, the refractive index of the body at the portion where the body adjoined the optical adjustment layer was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Example 4

As an Example of the present invention, a diffractive optical element 22 having the same construction as that of Example 2 was produced with a method similar to that of Example 2. However, there were differences from Example 2 in that, as the second resin of the second optical material composing the optical adjustment layer 3', the OH group-containing acrylate resin A used in Example 3 was used, and that 1-propanol (NPA; SP value: 11.9 [cal/cm$^3$]$^{1/2}$) was used as a solvent.

With a method similar to that of Example 1, the 1$^{st}$ order diffraction efficiency of the diffractive optical element of the present Example was calculated to be 93% at all wavelengths.

Furthermore, the diffractive optical element of the present Example was cut in a cross section through which its optical axis extended, and the border portion between the body and the optical adjustment layer was observed with an optical microscope, which revealed no change or degradation of the diffraction grating due to interaction between materials. Moreover, with the same method as in Example 1, the refractive index of the body at the portion where the body adjoined the optical adjustment layer was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Example 5

As an Example of the present invention, a diffractive optical element 22 having the same construction as that of Example 2 was produced with a method similar to that of Example 2. However, there were differences from Example 2 in that, as the second resin of the second optical material composing the optical adjustment layer 3', a mixed resin was used which was obtained by mixing the OH group-containing acrylate resin A used in Example 3 and epoxy acrylate resin D (d-line refractive index: 1.569; Abbe number: 35; SP value: 12.1 [cal/cm$^3$]$^{1/2}$) having a different solubility parameter at a weight ratio of 4:1 and ensuring that the solubility parameter of the entire resin was 11.6 [cal/cm$^3$]$^{1/2}$, and that 2-propanol (IPA; SP value: 11.5 [cal/cm$^3$]$^{1/2}$) was used as a solvent.

With a method similar to that of Example 1, the 1$^{st}$ order diffraction efficiency of the diffractive optical element of the present Example was calculated to be 91% or more at all wavelengths.

Furthermore, the diffractive optical element of the present Example was cut in a cross section through which its optical axis extended, and the border portion between the body and the optical adjustment layer was observed with an optical microscope, which revealed no change or degradation of the diffraction grating due to interaction between materials. Moreover, with the same method as in Example 1, the refractive index of the body at the portion where the body adjoined the optical adjustment layer was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Example 6

As an Example of the present invention, a diffractive optical element 22 having the same construction as that of Example 2 was produced with a method similar to that of Example 2. However, there were differences from Example 2 in that, as the second resin of the second optical material composing the optical adjustment layer 3', a mixed resin was used which was obtained by mixing the OH group-containing acrylate resin A used in Example 3 and epoxy acrylate resin D (d-line refractive index: 1.569; Abbe number: 35; SP value: 12.1 $[cal/cm^3]^{1/2}$) having a different solubility parameter at a weight ratio of 3:1 and ensuring that the solubility parameter of the entire resin was 11.7 $[cal/cm^3]^{1/2}$, and that 2-propanol (IPA; SP value: 11.5 $[cal/cm^3]^{1/2}$) was used as a solvent.

With a method similar to that of Example 1, the $1^{st}$ order diffraction efficiency of the diffractive optical element of the present Example was calculated to be 91% or more at all wavelengths.

Furthermore, the diffractive optical element of the present Example was cut in a cross section through which its optical axis extended, and the border portion between the body and the optical adjustment layer was observed with an optical microscope, which revealed no change or degradation of the diffraction grating due to interaction between materials. Moreover, with the same method as in Example 1, the refractive index of the body at the portion where the body adjoined the optical adjustment layer was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Example 7

As an Example of the present invention, a diffractive optical element 22 having the same construction as that of Example 2 was produced with a method similar to that of Example 2. However, there were differences from Example 2 in that, as the second resin of the second optical material composing the optical adjustment layer 3', only the epoxy acrylate resin D (d-line refractive index: 1.569; Abbe number: 35; SP value: 12.1 $[cal/cm^3]^{1/2}$) employed in Example 5 was used, and that 2-propanol (IPA; SP value: 11.5 $[cal/cm^3]^{1/2}$) was used as a solvent.

With a method similar to that of Example 1, the $1^{st}$ order diffraction efficiency of the diffractive optical element of the present Example was calculated to be 88% or more at all wavelengths.

Furthermore, the diffractive optical element of the present Example was cut in a cross section through which its optical axis extended, and the border portion between the body and the optical adjustment layer was observed with an optical microscope, which revealed no change or degradation of the diffraction grating due to interaction between materials. Moreover, with the same method as in Example 1, the refractive index of the body at the portion where the body adjoined the optical adjustment layer was measured to give a refractive index at the d line of 1.585, which is equal to the refractive index at the d line (1.585) in the case where there was no adjoining optical adjustment layer. From this, it was confirmed that the raw material of the optical adjustment layer 3' had not permeated the body 1.

Moreover, in the present Example, the difference in SP value between the body material and the optical adjustment layer was 2.3 $[cal/cm^3]^{1/2}$, which is a relatively large value. However, similarly to Examples 1 to 6, no problems occurred such as reduced yield or peeling of the optical adjustment layer during use.

Comparative Example 1

As a Comparative Example, a diffractive optical element having the same construction as that of Example 2 was produced by a method similar to that of Example 2. However, there were differences from Example 2 in that, as the resin composing the optical adjustment layer, a mixed resin was used which was obtained by mixing the OH group-containing acrylate resin A and alicyclic acrylate resin B used in Example 3 at a weight ratio of 1:3 and ensuring that the solubility parameter of the entire resin was 9.6 $[cal/cm^3]^{1/2}$, and that 2-propanol (IPA; SP value: 11.5 $[cal/cm^3]^{1/2}$) was used as a solvent.

With a method similar to that of Example 1, the $1^{st}$ order diffraction efficiency of the diffractive optical element of this Comparative Example was calculated to be 71% at all wavelengths. In this diffractive optical element, luminance was observed in regions other than the points of convergence of $0^{th}$ order light, $1^{st}$ order light, and $2^{nd}$ order light in a luminance measurement with a 3D micro-measurement apparatus. Moreover, three times as much transmitted light amount of white light as in Examples 1 to 6 was needed for the luminance measurement. This means that the diffractive optical element has a large optical loss.

Furthermore, the diffractive optical element of this Comparative Example was cut in a cross section through which its optical axis extended, and the border portion between the body and the optical adjustment layer was observed with an optical microscope, which revealed a discolor layer, which was considered as the altered-refractive index layer 101a shown in FIG. 2. Moreover, with the same method as in Example 1, the refractive index of the body at the portion where the body adjoined the optical adjustment layer was measured to give a refractive index at the d line of 1.572, which is lower by 0.013 than the d-line refractive index (1.585) in the case where there was no adjoining optical adjustment layer. That is, it is presumable that the raw material of the optical adjustment layer had permeated to cause a decrease in the refractive index, thus resulting in a lower diffraction efficiency.

Comparative Example 2

As a Comparative Example, a diffractive optical element having the same construction as that of Example 2 was produced by a method similar to that of Example 2. However, there were differences from Example 2 in that, as the resin composing the optical adjustment layer, a mixed resin was used which was obtained by mixing the OH group-containing acrylate resin A used in Example 3 and the alicyclic acrylate resin B used in Example 2 at a weight ratio of 1:1 and ensuring that the solubility parameter of the entire resin was 10.3 $[cal/cm^3]^{1/2}$.

With a method similar to that of Example 1, the $1^{st}$ order diffraction efficiency of the diffractive optical element of this Comparative Example was calculated to be 80% or more at all wavelengths. In this diffractive optical element, luminance existed in regions other than the points of convergence of $0^{th}$ order light, $1^{st}$ order light, and $2^{nd}$ order light in a luminance measurement with a 3D micro-measurement apparatus. Moreover, 1.5 times as much transmitted light amount of white light as in Examples 1 to 6 was needed for the luminance measurement. This means that the diffractive optical element has a large optical loss.

Furthermore, the diffractive optical element of this Comparative Example was cut in a cross section extending through the optical axis, and the border portion between the body and the optical adjustment layer was observed with an optical microscope, which revealed no altered-refractive index layer as shown in FIG. 2. However, with the same method as in Example 1, the refractive index of the body at the portion where the body adjoined the optical adjustment layer was measured to give a refractive index at the d line of 1.575, which is lower by 0.01 than the refractive index at the d line (1.585) in the case where there was no adjoining optical adjustment layer. That is, it is presumable that the raw material of the optical adjustment layer had permeated at a level not observable from the cross section of the diffraction grating to cause a minute decrease in the refractive index, thus resulting in a lower diffraction efficiency.

Comparative Example 3

As a Comparative Example against the Examples of the present invention, a diffractive optical element having the same construction as that of Example 2 was produced by a method similar to that of Example 2. However, there were differences from Example 2 in that: only OH group-containing acrylate resin A was used as the resin composing the optical adjustment layer; 2-propanol was used as a solvent; and no inorganic particles were mixed.

The diffractive optical element of this Comparative Example was cut in a cross section extending through the optical axis, and the border portion between the body and the optical adjustment layer was observed with an optical microscope, which revealed no change or degradation of the diffraction grating due to interaction between materials.

However, since the refractive index required of an optical adjustment layer was not attained, the $1^{st}$ order diffraction efficiency was 25%.

Comparative Example 4

As an Example of the present invention, a diffractive optical element having the same construction as Example 2 was produced by a method similar to that of Example 2. However, there was a difference from Example 2 in that methyl isobutyl ketone (MIBK; SP value: 9.5 $[cal/cm^3]^{1/2}$) was used as a solvent to be added to the optical adjustment layer.

The diffractive optical element of this Comparative Example was cut in a cross section through which its optical axis extended, and the border portion between the body and the optical adjustment layer was observed with an optical microscope, which revealed deformation of the diffraction grating due to interaction between materials, as shown in FIG. 1. Since the deformation of the diffraction grating was significant, diffracted light would not converge, and the diffraction efficiency was not measurable.

Comparative Example 5

As a Comparative Example against the Examples of the present invention, production of a diffractive optical element having the same construction as that of Example 2 was attempted. However, there was a difference from Example 2 in that the raw material of the optical adjustment layer was dropped in a mold rather than on the body, and after the raw material was dried, the mold was engaged on the body, and the acrylate resin was cured with ultraviolet irradiation, thus attempting to produce a diffractive optical element.

In this Comparative Example, some composite material to become an optical adjustment layer remained in the mold upon release, and thus an optical adjustment layer of a desired shape was not formed on the body.

(Discussion of Results)

Table 1 below shows, with respect to Examples 1 to 6 and Comparative Examples 1 to 5, the resin and solvent used in the optical adjustment layer, and the differences between their solubility parameters and the solubility parameter of the resin composing the body. Moreover, results of observing intrusion into the body materials of the diffractive optical elements produced, and the calculated $1^{st}$ order diffraction efficiencies are shown.

TABLE 1

| | material of optical adjustment layer | solvent resin | SP value (upper: solvent, lower: uncured resin) $[cal/cm^3]^{1/2}$ | difference from body SP value (upper: solvent, lower: uncured resin) | intrusion into body | $1^{st}$ order diffraction efficiency |
|---|---|---|---|---|---|---|
| Example 1 | resin | no solvent | — | — | NO | 87% |
| | | C | 11.2 | 1.4 | | |
| Example 2 | composite | PGME | 10.8 | 1.0 | NO | 92% |
| | | B | 9.0 | 0.8 | | |
| Example 3 | composite | NPA | 11.9 | 2.1 | NO | 85% |
| | | A, B | 11.1 | 1.3 | | |
| Example 4 | composite | NPA | 11.9 | 2.1 | NO | 93% |
| | | A | 11.5 | 1.7 | | |
| Example 5 | composite | IPA | 11.5 | 1.7 | NO | 91% |
| | | A, D | 11.6 | 1.8 | | |
| Example 6 | composite | IPA | 11.5 | 1.7 | NO | 91% |
| | | A, D | 11.7 | 1.9 | | |

TABLE 1-continued

| | material of optical adjustment layer | solvent | SP value (upper: solvent, lower: uncured resin) [cal/cm³]^(1/2) | difference from body SP value (upper: solvent, lower: uncured resin) | intrusion into body | 1st order diffraction efficiency |
|---|---|---|---|---|---|---|
| Example 7 | composite | IPA | 11.5 | 1.7 | NO | 88% |
| | | D | 12.1 | 2.3 | | |
| Comparative Example 1 | composite | IPA A, B | 11.5 9.6 | 1.7 0.2 | FIG. 2 | 71% |
| Comparative Example 2 | composite | IPA A, B | 11.5 10.3 | 1.7 0.5 | NO | 80% |
| Comparative Example 3 | resin only | none A | — 11.5 | — 1.7 | NO | 25% |
| Comparative Example 4 | composite | MIBK A | 9.5 11.5 | 0.3 1.7 | FIG. 1 | not measurable |
| Comparative Example 5 | composite, dropped in mold | IPA A | 11.5 11.5 | 1.7 1.7 | NO | not measurable |

As shown in Table 1, the difference in solubility parameter between the resins contained in the body and the optical adjustment layer of the diffractive optical element of each Example is 0.8 or more, indicative that no intrusion of resin into the body material has occurred and that a high diffraction efficiency is obtained.

On the other hand, as can be seen from Comparative Examples 1 and 2, when the difference in solubility parameter between the resins contained in the body and the optical adjustment layer is smaller than 0.8, generation of an altered-refractive index layer or an altered-refractive index microlayer due to intrusion of resin into the body is observed, whereby the $1^{st}$ order diffraction efficiency is deteriorated.

Moreover, as can be seen from Comparative Example 4, even when the difference in solubility parameter between the resins contained in the body and the optical adjustment layer is 0.8 or more, if the raw material of the optical adjustment layer contains a solvent whose solubility parameter difference from the resin contained in the body is less than 0.8, deformation of the diffraction grating occurs due to permeation of the solvent into the body.

Figure 9:
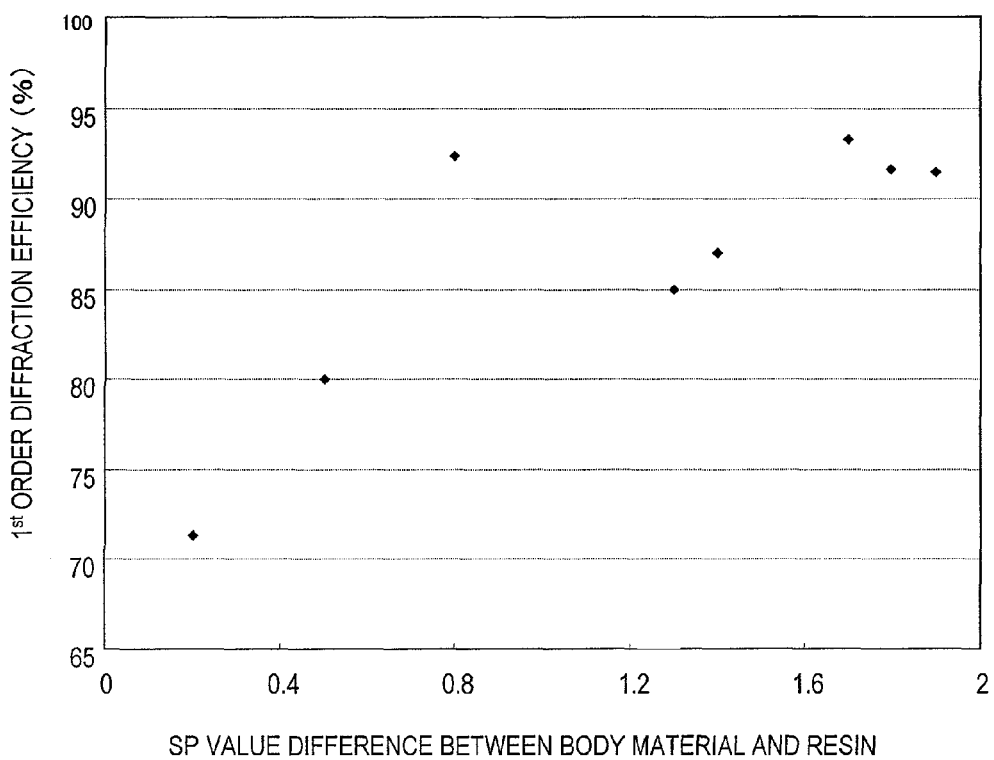
[FIG. 9] A graph showing a relationship between $1^{st}$ order diffraction efficiency and a difference in solubility parameter between the body and the resin in Examples of the diffractive optical element according to the present invention.

FIG. 9 shows a relationship between $1^{st}$ order diffraction efficiency and the difference in solubility parameter (SP value) between the resins contained in the body and the optical adjustment layer, with respect to Examples 1 to 7 and Comparative Examples 1 and 2. From FIG. 9, it can be seen that a $1^{st}$ order diffraction efficiency of 85% or more is obtained when the difference in solubility parameter between the resins contained in the body and the optical adjustment layer is 0.8 or more. Herein, the $1^{st}$ order diffraction efficiency is calculated based on (eq. 4). As has been described above, as for Comparative Examples 1 and 2, there is a lot of components which do no converge at the convergence positions of $0^{th}$ order, $1^{st}$ order, $2^{nd}$ order diffracted light, and 1.5 to 3 times as much transmitted light amount as the light amounts of Examples 1 to 7 is needed for performing the evaluation, and therefore their actual diffraction efficiencies are considered to be much lower than 71% or 80%.

Figure 10:
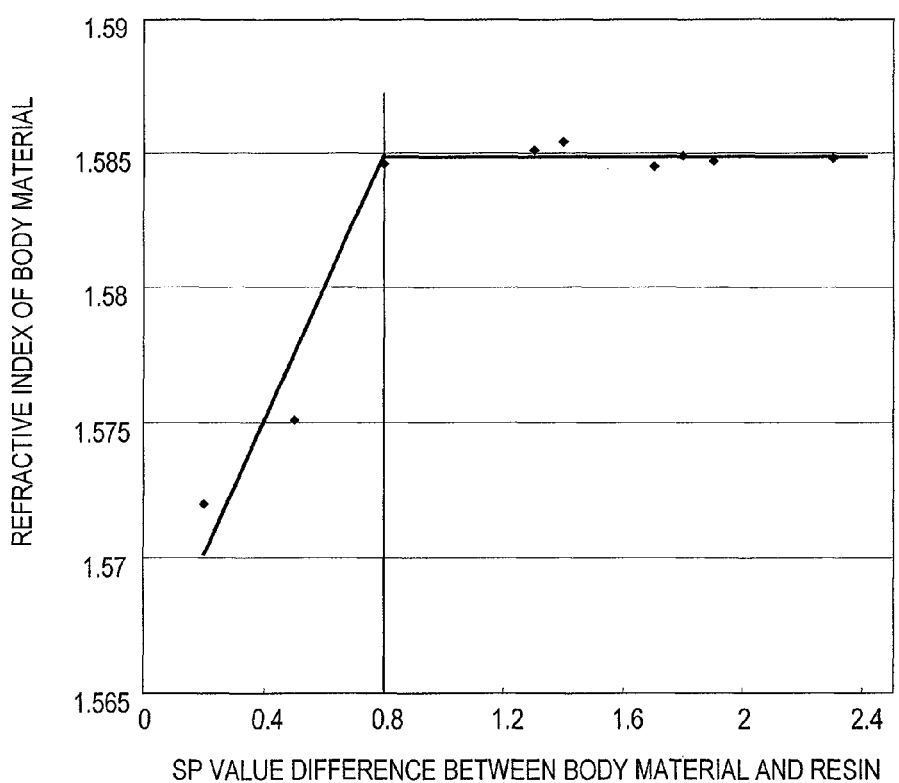
[FIG. 10] A graph showing a relationship between the refractive index at a portion at which the body adjoins the optical adjustment layer and a difference in solubility parameter between the body and the resin in Examples of the diffractive optical element according to the present invention.

FIG. 10 shows a relationship between the refractive index of the body and the difference in solubility parameter (SP value) between the resins contained in the body and the optical adjustment layer, with respect to Examples 1 to 7 and Comparative Examples 1 and 2. From FIG. 10, it can be seen that the refractive index of the body is approximately constant when the difference in solubility parameter between the resins contained in the body and the optical adjustment layer is 0.8 or more. This is considered to be because, when the difference in solubility parameter between is 0.8 or more, permeation of resin into the body does not occur, so that the refractive index is not deteriorated.

As described above, in accordance with the diffractive optical element of the present Example, interaction between materials composing the element can be suppressed, thus making it possible to provide a diffractive optical element which is free of deformation of the diffraction grating of the body and unwanted diffracted light and stray light due to changes in the refractive index of the body, and which has good optical characteristics and a high mass producibility.

INDUSTRIAL APPLICABILITY

A diffractive optical element according to the present invention can be suitably used for various optical systems, and can be suitably used as a camera lens, a spatial low-pass filter, a polarizing hologram, and the like.

REFERENCE SIGNS LIST

1, 101 body
2 diffraction grating
3, 3', 103, 103' optical adjustment layer
4 inorganic particle
6 dispenser
8 mold
11 printing plate
12 print pattern
13 raw material of optical adjustment layer
14 pad
21, 22, 111, 112, 113, 114 diffractive optical element

The invention claimed is:
1. A diffractive optical element comprising:
a body being composed of a first optical material containing a first resin, and having a diffraction grating on a surface thereof; and
an optical adjustment layer being composed of a second optical material containing a second resin, and provided on the body so as to cover the diffraction grating, wherein, the first optical material has a refractive index which is smaller than a refractive index of the second optical material;

the refractive index of the first optical material has a wavelength dispersion which is greater than a wavelength dispersion of the refractive index of the second optical material;

a difference in solubility parameter between the first resin and the second resin is no less than 0.8 $[cal/cm^3]^{1/2}$ and no more than 2.5 $[cal/cm^3]^{1/2}$; and the second resin contains an acrylate resin including an OH group.

2. The diffractive optical element of claim 1, wherein the first optical material contains substantially no inorganic particles.

3. The diffractive optical element of claim 1, wherein the first optical material contains only the first resin.

4. The diffractive optical element of claim 1, wherein the difference in solubility parameter between the first resin and the second resin is no less than 0.8 $[cal/cm^3]^{1/2}$ and no more than 2.3 $[cal/cm^3]^{1/2}$.

5. The diffractive optical element of claim 4, wherein the first optical material contains substantially no inorganic particles.

6. The diffractive optical element of claim 4, wherein the first optical material contains only the first resin.

7. The diffractive optical element of claim 1, wherein the second optical material further contains inorganic particles, the inorganic particles being dispersed in the second resin.

8. The diffractive optical element of claim 7, wherein, as a main component, the inorganic particles contain at least one selected from the group consisting of zirconium oxide, yttrium oxide, lanthanum oxide, hafnium oxide, scandium oxide, alumina, and silica.

9. The diffractive optical element of claim 8, wherein the inorganic particles have an effective particle size of no less than 1 nm and no more than 100 nm.

10. The diffractive optical element of claim 1, wherein the solubility parameter of the second resin is greater than the solubility parameter of the first resin.

11. The diffractive optical element of claim 10, wherein the first resin is polycarbonate.

12. The diffractive optical element of claim 10, wherein the second resin is an energy beam-curing resin.

* * * * *